United States Patent
Danilov et al.

(10) Patent No.: US 12,001,881 B2
(45) Date of Patent: Jun. 4, 2024

(54) EVENT PRIORITIZATION FOR AN ORDERED EVENT STREAM

(71) Applicant: EMC IP Holding Company LLC, Hopkinton, MA (US)

(72) Inventors: Mikhail Danilov, Saint Petersburg (RU); Maksim Vazhenin, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 562 days.

(21) Appl. No.: 17/228,611

(22) Filed: Apr. 12, 2021

(65) Prior Publication Data
US 2022/0326985 A1 Oct. 13, 2022

(51) Int. Cl.
*G06F 9/48* (2006.01)
*G06F 9/54* (2006.01)
(Continued)

(52) U.S. Cl.
CPC ............ *G06F 9/4881* (2013.01); *G06F 9/542* (2013.01); *G06F 16/2255* (2019.01); *G06Q 10/06393* (2013.01)

(58) Field of Classification Search
CPC .................................................. G06F 9/4881
See application file for complete search history.

(56) References Cited

U.S. PATENT DOCUMENTS

| 3,617,587 A | 11/1971 | Nayar et al. |
| 5,826,977 A | 10/1998 | Fowler et al. |

(Continued)

FOREIGN PATENT DOCUMENTS

| CA | 2 534 170 A1 | 7/2007 |
| CA | 2672879 | 4/2008 |

(Continued)

OTHER PUBLICATIONS

Notice of Allowance mailed Nov. 15, 2022 for U.S. Appl. No. 16/864,892, 48 pages.
(Continued)

*Primary Examiner* — Charlie Sun
(74) *Attorney, Agent, or Firm* — Amin, Turocy & Watson, LLP

(57) ABSTRACT

Event prioritization for an ordered event stream (OES) is disclosed. Unlike conventional prioritization techniques, the disclosed subject matter can be performed by an OES data storage system to provide direct, rather than indirect, control of prioritization. In an embodiment, a prioritized hashed key (PHK) can be determined from an event characteristic and an indicated event priority value based on a selectable priority-sensitive hashing function. As such, events with a same key characteristic but different indicated priorities can have different PHKs, events with different key characteristics but the same indicated priority can have different PHKs, and events with the same key characteristic and the same priority can have a same PHK. An event priority can be inherently comprised in the PHK without needing to explicitly store the priority value with a written event in the OES. Moreover, the disclosed prioritization for the OES can be compatible with OES scaling techniques.

20 Claims, 10 Drawing Sheets

(51) Int. Cl.
*G06F 16/22* (2019.01)
*G06Q 10/0639* (2023.01)

(56) References Cited

U.S. PATENT DOCUMENTS

| | | |
|---|---|---|
| 7,107,419 B1 | 9/2006 | Ghemawat et al. |
| 7,340,690 B2 | 3/2008 | Lau |
| 7,430,570 B1 | 9/2008 | Srinivasan et al. |
| 7,610,437 B2 | 10/2009 | Sinclair et al. |
| 7,769,717 B2 | 8/2010 | Federwisch et al. |
| 7,984,084 B2 | 7/2011 | Sinclair |
| 8,285,918 B2 | 10/2012 | Maheshwari |
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,825,848 B1 | 9/2014 | Dotan et al. |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1 | 8/2016 | Kulkarni |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer |
| 9,652,307 B1 | 5/2017 | Soman et al. |
| 9,715,434 B1 | 6/2017 | Xu et al. |
| 9,734,050 B2 | 8/2017 | Sinclair et al. |
| 9,734,911 B2 | 8/2017 | Sinclair et al. |
| 9,753,932 B1 | 9/2017 | Brow et al. |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,277,524 B1 | 4/2019 | Kaitha et al. |
| 10,338,834 B1 | 7/2019 | Dighe et al. |
| 10,338,958 B1 | 7/2019 | Kamboj et al. |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1 | 12/2020 | Evenson |
| 10,867,033 B2 | 12/2020 | Keren et al. |
| 10,891,228 B2 | 1/2021 | Burow |
| 10,909,174 B1 | 2/2021 | Martin et al. |
| 10,929,322 B2 * | 2/2021 | McDonald ............ G06F 13/225 |
| 10,983,715 B2 | 4/2021 | Sharoni et al. |
| 11,016,826 B2 | 5/2021 | Lehmann |
| 11,086,537 B2 | 8/2021 | Byun |
| 11,194,638 B1 | 12/2021 | Danilov et al. |
| 11,314,779 B1 | 4/2022 | Jain |
| 11,354,054 B2 | 6/2022 | Danilov et al. |
| 2004/0199524 A1 | 10/2004 | Rys et al. |
| 2005/0025152 A1 | 2/2005 | Georgiou et al. |
| 2005/0055519 A1 | 3/2005 | Stuart et al. |
| 2006/0036568 A1 | 2/2006 | Moore et al. |
| 2006/0058987 A1 | 3/2006 | Kumar et al. |
| 2007/0033325 A1 | 2/2007 | Sinclair et al. |
| 2007/0047635 A1 | 3/2007 | Stojanovic et al. |
| 2007/0220518 A1 | 9/2007 | Verbowski et al. |
| 2008/0037549 A1 * | 2/2008 | Haardt ............... H04L 47/6215 |
| | | 370/395.4 |
| 2008/0059724 A1 | 3/2008 | Stifter |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0088296 A1 | 4/2010 | Periyagaram et al. |
| 2010/0077013 A1 | 5/2010 | Clements et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1 | 10/2011 | Ishii |
| 2012/0102503 A1 | 4/2012 | Meijer et al. |
| 2012/0109985 A1 | 5/2012 | Chandrasekaran |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1 | 10/2013 | McNeeney et al. |
| 2013/0290598 A1 | 10/2013 | Fiske et al. |
| 2014/0006465 A1 | 1/2014 | Davis et al. |
| 2014/0089264 A1 | 3/2014 | Talagala et al. |
| 2014/0223115 A1 | 8/2014 | Dinkjian et al. |
| 2014/0270343 A1 | 9/2014 | Sanaullah et al. |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Isiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1 | 7/2016 | Soncodi et al. |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0091570 A1 | 3/2017 | Rao et al. |
| 2017/0123655 A1 | 5/2017 | Sinclair et al. |
| 2017/0147494 A1 | 5/2017 | Andre et al. |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1 | 7/2017 | Duncan |
| 2017/0255392 A1 | 9/2017 | Nakashima |
| 2017/0289214 A1 | 10/2017 | Cho et al. |
| 2017/0374147 A1 | 12/2017 | McNair et al. |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 | 6/2018 | Gervais et al. |
| 2018/0184138 A1 | 6/2018 | Shaw et al. |
| 2018/0189175 A1 | 6/2018 | Ji et al. |
| 2018/0314727 A1 | 11/2018 | Epstein et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1 | 11/2018 | Paduroiu |
| 2018/0332367 A1 | 11/2018 | Kaitchuck et al. |
| 2018/0336256 A1 | 11/2018 | Li et al. |
| 2018/0345140 A1 | 12/2018 | Posin |
| 2019/0004863 A1 | 1/2019 | Mainali et al. |
| 2019/0026301 A1 | 1/2019 | Wang et al. |
| 2019/0046037 A1 | 2/2019 | Ramesh et al. |
| 2019/0057138 A1 | 2/2019 | Knowles et al. |

(56) References Cited

U.S. PATENT DOCUMENTS

| | | | |
|---|---|---|---|
| 2019/0065246 | A1 | 2/2019 | Senapaty et al. |
| 2019/0129806 | A1 | 5/2019 | Hsu et al. |
| 2019/0138494 | A1 | 5/2019 | Inoue |
| 2019/0197173 | A1 | 6/2019 | Tahara et al. |
| 2019/0220671 | A1 | 7/2019 | Slipenchuck |
| 2019/0278849 | A1 | 9/2019 | Chandramouli et al. |
| 2019/0327297 | A1 | 10/2019 | Madani |
| 2019/0332318 | A1 | 10/2019 | Gooding et al. |
| 2019/0340180 | A1 | 11/2019 | Barsness et al. |
| 2019/0349422 | A1 | 11/2019 | Dhruvakumar et al. |
| 2019/0392866 | A1 | 12/2019 | Yoon et al. |
| 2020/0034468 | A1 | 1/2020 | Lei et al. |
| 2020/0089420 | A1 | 3/2020 | Sharoni et al. |
| 2020/0174695 | A1 | 6/2020 | Bazarsky et al. |
| 2020/0250172 | A1 | 8/2020 | Busjaeger et al. |
| 2020/0310686 | A1 | 10/2020 | Truong et al. |
| 2020/0320005 | A1 | 10/2020 | Shulman et al. |
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0084318 | A1 | 3/2021 | Kuo et al. |
| 2021/0110328 | A1 | 4/2021 | Hsiao et al. |
| 2021/0124746 | A1 | 4/2021 | Klaedtke |
| 2021/0157520 | A1 | 5/2021 | Bavishi et al. |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2021/0374021 | A1 | 12/2021 | Santhakumar et al. |
| 2022/0035533 | A1 | 2/2022 | Danilov et al. |
| 2022/0182724 | A1 | 6/2022 | Gupta et al. |
| 2022/0248090 | A1 | 8/2022 | Dhiman et al. |
| 2022/0326878 | A1 | 10/2022 | Paduroiu |

FOREIGN PATENT DOCUMENTS

| | | | |
|---|---|---|---|
| CN | 1708029 | | 12/2005 |
| CN | 104901958 | | 9/2015 |
| CN | 105591926 | | 5/2016 |
| GB | 2377038 | | 12/2002 |
| WO | 2002101585 | | 12/2002 |
| WO | 2004/080067 | A1 | 9/2004 |
| WO | 2009014993 | | 1/2009 |
| WO | 2015/196281 | A1 | 12/2015 |
| WO | 2015191120 | | 12/2015 |
| WO | 2018148149 | | 8/2018 |

OTHER PUBLICATIONS

Notice of Allowance mailed Nov. 23, 2022 for U.S. Appl. No. 17/408,344, 35 pages.

Notice of Allowance mailed Nov. 17, 2022 for U.S. Appl. No. 16/944,094, 23 pages.

Notice of Allowance received for U.S. Appl. No. 17/063,906, dated Feb. 6, 2023, 29 pages.

Notice of Allowance received for U.S. Appl. No. 17/383,425, dated Feb. 1, 2023, 37 pages.

Office Action dated Feb. 10, 2023 for U.S. Appl. No. 17/145,588, 78 pages.

Non Final Office Action received for U.S. Appl. No. 17/976,574 dated Mar. 2, 2023, 55 pages.

Notice of Allowance received for U.S. Appl. No. 17/337,940 dated Mar. 1, 2023, 70 pages.

Notice of Allowance received for U.S. Appl. No. 17/223,263, dated Apr. 6, 2023, 32 pages.

Office Action mailed May 12, 2023 for U.S. Appl. No. 17/152,558, 51 pages.

Non Final Office Action received for U.S. Appl. No. 18/164,744 dated Aug. 31, 2023, 46 pages.

Notice of Allowance received for U.S. Appl. No. 17/976,574, dated Jul. 6, 2023, 41 pages.

Non-Final Office Action received for U.S. Appl. No. 17/503,024, dated Jun. 23, 2023, 87 pages.

Notice of Allowance received for U.S. Appl. No. 17/145,588, dated Aug. 7, 2023, 28 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#/building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Office Action dated Oct. 1, 2021 for U.S. Appl. No. 16/915,762, 57 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

Office Action dated Oct. 1, 2021 for U.S. Appl. No. 17/127,724, 41 pages.

(56) References Cited

OTHER PUBLICATIONS

Office Action dated Jan. 21, 2022 for U.S. Appl. No. 16/864,892, 26 pages.
Notice of Allowance dated Feb. 24, 2022 for U.S. Appl. No. 17/038,079, 55pgs.
Azhar et al., ""Efficient selection of access control systems through multi criteria analytical hierarchy process"", IEEE, doi: 10.1109/ICET.2012.6375419, 2012, pp. 1-8. (Year: 2012).
Rox et al., ""Construction and Deconstruction of Hierarchical Event Streams with Multiple Hierarchical Layers"", IEEE, doi: 10.1109/ECRTS.2008.13, 2008, pp. 201-210. (Year: 2008).
Notice of Allowance dated Feb. 18, 2022 for U.S. Appl. No. 17/083,145, 70pgs.
Office Action dated Mar. 21, 2022 for U.S. Appl. No. 16/864,905, 125 pgs.
Muskardin et al., "Implementation of Hashing Algorithms in Stream Mining", International Conference on Smart Systems and Technologies (SST), Oct. 2018 , pp. 233-238.
Notice of Allowance mailed Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/loTDI49375.2020.00014. (Year: 2020).
Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).
Office Action mailed Apr. 20, 2022 for U.S. Appl. No. 16/944,094, 48 pages.
Office Action mailed Apr. 12, 2022 for U.S. Appl. No. 17/038,102, 48 pages.
Notice of Allowance mailed Apr. 27, 2022 for U.S. Appl. No. 17/127,724, 19 pages.
Office Action mailed May 24, 2022 for U.S. Appl. No. 17/237,535, 62 pages.
Non-Final Office Action received for U.S. Appl. No. 17/063,906, dated Oct. 27, 2022, 59 pages.
Notice of Allowance received for U.S. Appl. No. 16/864,905, dated Nov. 30, 2022, 347 pages.
Tony Tung et al., "Topology Dictionary for 3D Video Understanding", IEEE Transactions on Pattern Analysis and Machine Intelligence ( vol. 34, Issue: 8, Aug. 2012), Dec. 2011, pp. 1645-1657.
A. Bulut et al., "Distributed data streams indexing using content-based routing paradigm", 19th IEEE International Parallel and Distributed Processing Symposium, Apr. 2005, pp. 1-10.
Notice of Allowance received for U.S. Appl. No. 17/070,029, dated Dec. 2, 2022, 36 pages.
Non-Final Office Action received for U.S. Appl. No. 17/223,263, dated Nov. 28, 2022, 64 pages.
Non-Final Office Action received for U.S. Appl. No. 17/152,558, dated Dec. 7, 2022, 59 pages.
Non-Final Office Action received for U.S. Appl. No. 17/337,940, dated Dec. 30, 2022, 68 pages.
Office Action mailed Jul. 8, 2022 for U.S. Appl. No. 16/864,892, 33 pages.
Office Action mailed Jul. 15, 2022 for U.S. Appl. No. 16/864,905, 77 pages.
Office Action mailed Sep. 1, 2022 for U.S. Appl. No. 16/944,094, 25 pages.
Office Action mailed Jul. 21, 2022 for U.S. Appl. No. 17/070,029, 68 pages.
Notice of Allowance mailed Aug. 24, 2022 for U.S. Appl. No. 17/152,544, 55 pages.
Office Action mailed Sep. 15, 2022 for U.S. Appl. No. 17/383,425, 61 pages.
Phaujdar, "Understanding Event Streams—A Comprehensive Guide 101_ Learn Hevo" [https://hevodata.com/learn/understanding-event-streams/] (Feb. 17, 2021) (Year: 2021).
Dhanushka, "Understanding Kafka Topic Partitions" [https://medium.com/event-driven-utopia/understanding-kafka-topic-partitions-ae40f80552e8]—(Mar. 28, 2021) (Year: 2021).
Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).
Office Action mailed Sep. 30, 2022 for U.S. Appl. No. 17/408,344, 66 pages.
Notice of Allowance received for U.S. Appl. No. 18/164,744 dated Dec. 28, 2023, 81 pages.
Non-Final office action received for U.S. Appl. No. 17/152,558 dated Oct. 19, 2023, 66 pages.
Non-Final office action received for U.S. Appl. No. 17/237,517 dated Nov. 27, 2023, 117 pages.
Final office action received for U.S. Appl. No. 17/503,024 dated Dec. 1, 2023, 98 pages.
Notice of Allowance received for U.S. Appl. No. 17/145,588, dated Oct. 18, 2023, 6 pages.
Notice of Allowance for U.S. Appl. No. 17/503,024 dated Feb. 23, 2024.
Notice of Allowance for U.S. Appl. No. 17/237,517 dated Feb. 28, 2024.

\* cited by examiner

EVENT PRIORITIZATION FOR AN ORDERED EVENT STREAM

BACKGROUND

Conventional data storage techniques can generally prioritize an event operation at an application level, e.g., outside of a stream storage system rather than the stream storage system providing event prioritization to external an application. Typically, more important/urgent events, e.g., higher priority events, can be processed before less important/urgent events, e.g., lower priority events. An event's importance, urgency, etc., can generally be indicated via some positive integer value, e.g., a 3-priority can be regarded as more important/urgent than a 2-priority, etc. Where many modern streaming data platforms may provide no built-in support for event prioritization, one popular option for prioritizing data processing has been to create multiple independent streams, topics, etc., wherein there can be one stream per priority value such that a new event can initially be stored to streams in accordance with an event priority. In these types of streaming data systems, a stream reader, consumer, etc., can be supposed to read from a high priority stream first and, if the stream does not have more events to read, fallback to reading from a stream with a lower priority. However, it is noted that although this type of storage may appear to look like real-time priority-driven data processing, it is actually implemented at the application level, e.g., at the writer application and reader application level, and not at the platform level, e.g., not at the OES storage system level. This can result in poor control over event prioritization by an OES system that can lead to errors, missed events, inverted-priority conditions, etc. Another, much less popular and still experimental option, is to time-share 'soft prioritization,' e.g., have a per priority stream segment that can be read according to a designated proportionality, e.g., first, read X high priority, second, read Y medium priority, third, read Z low priority events, fourth, repeat as needed. Generally, in this approach, the reader is to read more from segments with higher priorities. This process can be complicated and can be associated with difficult implementation, and moreover, it is not a real-time process. Further, the above example modern and experimental processes can be contingent upon a per priority-resource allocation that is typically not flexible nor well organized, leading to perhaps substantial difficulty in deploying such techniques among different storage environments, etc. The above-described background is merely intended to provide a contextual overview of some issues regarding conventional data storage and is not intended to be exhaustive. Other contextual information may become further apparent upon review of the following detailed description.

DETAILED DESCRIPTION

Figure 1:
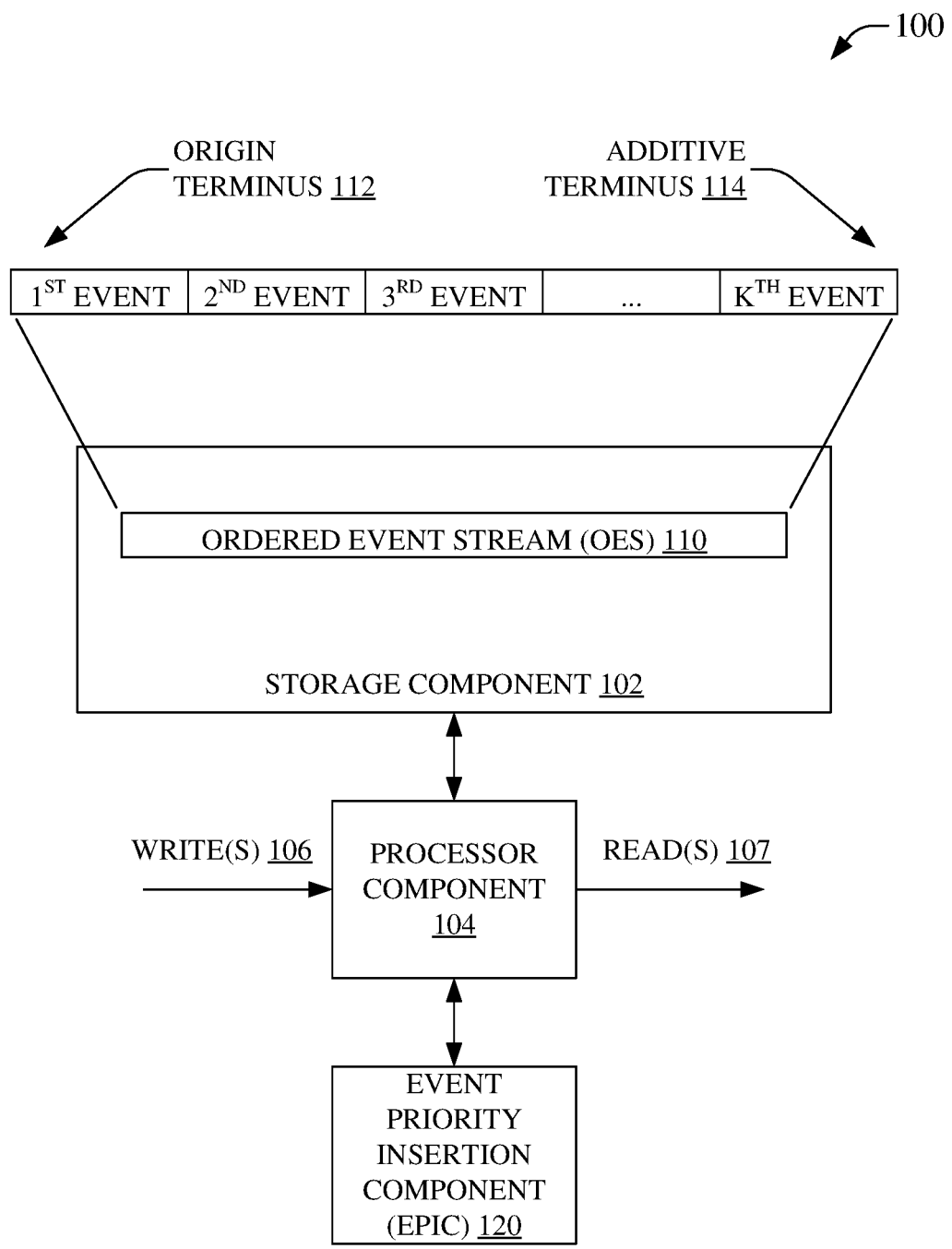
FIG. 1 is an illustration of an example system that can facilitate event prioritization for an ordered event stream (OES), in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As is noted hereinabove, conventional data storage techniques can generally prioritize an event operation outside the stream storage system. The instant disclosure is generally applicable with any prioritization modality, e.g., a particular ranking of event importance, urgency, etc., is not the primary thrust of the instant application and, as such, the discussion herein is generally presented in relation to a priority mode employing integer values where a higher integer can be associated with an higher impetus to read the event over a loser integer priority value, however, any ranking or prioritization scheme can be readily employed without departing from the scope of the instant disclosure. Where modern typical streaming data platforms do not provide built-in support for event prioritization, the instant disclosure can provide advantages over, for example, creating multiple independent streams, topics, etc., use of time-shared event read techniques, etc. The presently disclosed subject matter tends to be flexible, highly adaptive, near real-time or real-time, can run in-system rather than in-application, etc., which can enable less complex deployment, facilitate scaling/auto-scaling of a stream, etc.

Generally, a stream can be a durable, elastic, append-only, unbounded sequence of events. An event can be added to a head of a stream of events, e.g., a first event can be considered as residing at a tail of the event stream and a most recent event can be regarded as residing at the head of the stream with other events ordered between the tail and the head of the stream. The events need not be stored in contiguous storage locations to be logically sequenced in the stream representation, e.g., a first event can be stored on a first disk, a second event on a remotely located second disk, and a third event stored at a further remote third disk, the stream can logically sequence the first, second, and third events by reference to their stored data in different physical locations, the ordered event stream (OES) can be regarded as an abstraction comprising the events in an ordered manner. It is noted that some stream storage systems can employ an alternative head/tail terminology, for example, a first event can be added at a head of an OES, while subsequent new events can then be added sequentially to a tail of the OES, however, this is indistinguishable in all other ways from the head/tail convention generally employed in the instant disclosure, e.g., an event is still part of a sequence of events and corresponds to a key. Every event of the stream can be associated with a routing key, or simply key for convenience, typically a hashed key. A key can often be derived from data of the event, e.g., a "machine-id," "location," "device type," "customer number," "vehicle identifier," etc. In one or more embodiments, an event can be associated with a key, however, data yet to be written to an event can be associated with an access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, a access target value can correspond to data to be stored in an event and can be derived from that data or other characteristics corresponding to the data such that when the event is stored the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a "key's" value such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key, unless more specificity is needed in some given example, and this convention is generally used in the instant disclosure for simplicity and brevity. Events with the same routing key can be written to a corresponding stream or stream segment, and can also be consumed, e.g., read, in the order they were written to the stream or stream segment.

A stream can be comprised of a group of portions, e.g., shards, partitions, pieces, etc., that can generally be referred to as stream segments, or simply segments for convenience. The segments can act as logical containers for one or more events within a stream, e.g., it is understood that events written to geographically disparate data storage devices can logically be written to the same stream segment, e.g., same logical container, according to the instant disclosure. When a new event is written to a stream, it can be stored to a segment of the stream based on a corresponding key. Event routing keys can be hashed to form a "key space". The key space can be employed to divide the stream into a number of parts, e.g., segments. In typical embodiments, consistent hashing can be employed to assign events to appropriate segments. As an example, where a stream comprises only one segment, all events to be written to the stream are written to the same segment in an ordered manner and the segment corresponds to the entire key space. As another example, where a stream comprises two segments, the key space of the event, e.g., from zero to 'n', can be associated with the two segments, however each of the two segments can be associated with a portion of the total key space, for example, the first segment can store events with a key between zero and 'm' and the second segment can store events with a key between 'm+1' and 'n'. It will be appreciated that more segments can serve to further divide the key space such that a segment can store an event with a key falling within the range of the key space associated with that segment. As an example, a four-segment event stream can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In one or more embodiments, a segment of an event stream is generally associated with a single processing instance, e.g., one processor, one cooperating group of processors, etc., to assure ordering of the events stored in the segment. A processing instance can be a single real physical processor, a virtualized processor instance executing on one or more real physical processors, a group of real physical processors, a group of virtual processor instances executing on one or more real physical processors, etc. As an example, a processing instance can be embodied via a blade server in a computing facility. As another example, a processing instance can be a virtual processor deployed in an elastic computing system, e.g., a 'cloud server,' etc.

Typically, a processing instance can be associated with a level of performance which, in some embodiments, can be measured via one or more key performance indicators (KPIs) for the processing instance. As an example, a first blade server can have a first level of performance and a second blade server can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support costs, real estate for deployment costs, operations per unit time as a cost, etc. As such, selecting an appropriate processing instance can be associated with optimizing cost. As an example, if an event stream typically consumes less than one unit of work, then pairing the stream with a processing instance that can perform one unit of work can be deemed a better use of computing resources, e.g., lower overall aggregate costs, etc., than pairing the even stream with a processing instance that can perform 200 units of work which can result in wasting up to 199 units of work through underutilization. Moreover, in this example, the 200-unit processing instance, for example, can be a newer high end processing instance that can have a high monetary cost, and generate more heat than the one-unit processing instance that, for example, can be a low-cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In various embodiments described herein, scaling technology employed in a stream data storage system can improve a stream data storage system, such as by scaling an OES to comprise one or more segments that can improve use of computing resources in contrast to a conventional unscaled stream data storage system. In one or more example embodiments, a stream, e.g., an OES or portion thereof, can be divided evenly to distribute the work corresponding to event operations, e.g., splitting stream in to two subsequent similar portions can, for example, enable use two processors in parallel rather than one processor. This can be regarded as a form of 'symmetrical scaling' of an event stream. Alternatively, a stream can be split into dissimilar portions, regarded as a form of 'asymmetrical scaling,' that can result in portions that are dissimilar, e.g., one segment can correspond to a greater or lesser key space than second segment, etc. In some embodiments, symmetric and asymmetric scaling can be performed on one portion of an OES and can result in two or more subsequent other portions of the OES, for example, symmetrical scaling of a stream into three or more similar portions, etc. In one or more embodiments, these other portions can also comprise a mix of symmetric and asymmetric splits of the stream, for example, a first portion of a stream can be split into a second, third, and fourth portion, wherein the second and third can be similar, e.g., symmetric, and the fourth portion can be dissimilar from the second or third portion, e.g., asymmetric. In this example, the scaling can be referred to as 'mixed scaling,' e.g., implying that the subsequent portions of the stream after scaling can comprise a mix of symmetric and asymmetric portions.

Scaling of the event stream can be in response to a threshold consumption of computing resources, e.g., when a threshold work level is traversed, an event stream can be scaled. In one or more embodiments, scaling can generally be associated with allocating computing operations to logical portions of an ordered stream of events. As an illustrative example, first processor(s) can satisfactorily write 5000 events per unit time to an ordered event stream, e.g., into storage corresponding to the ordered event stream, however, where the rate of events to be written to the stream, for example, doubles to 10000 events per unit time, the first processor(s) can be determined to be underperforming due to being overly burdened and it can be desirable to scale the OES to compensate for overburdening of the first processor(s). As such, scaling can add second processor(s) such that the load on the first, and now the second, processors can be similar, e.g., the writing of the example 10000 events per unit time can be managed by two or more processor after the scaling rather than just the first processor(s) before the scaling of the OES. As noted elsewhere herein, the scaling can be symmetric, asymmetric, or mixed scaling. It can be further noted that symmetric scaling of a logical key space of events can result in non-symmetric loading of a computing resource(s). As an expansion of the previous example, where the first processor(s) write the 5000 events per unit time to event keys between 0 and 0.5 of the key space, and this load doubles as a result of an additional 5000 writes with an event key between 0 and 0.1 of the key space, then scaling the OES by symmetrically dividing the key space between the first processor(s) from 0 to 0.25 and the second processor(s) from 0.25 to 0.5 of the key space should not result in a symmetric division of computer resource loading, e.g., the first processor(s) would now address a portion of the initial 5000 events and an additional burden from the 5000 events between 0 and 0.1 of the key space, while the second processor(s) would address the initial 5000 events less the portion still being managed by the first processor(s) but would not get any part of the additional 5000 events. As such, mere equal division of a portion of an OES that is ignorant of the distribution of work across a key space of the event stream can be less effective that might otherwise be desired. Improved scaling technologies can be considerate of a resulting workload and can, for example, accommodate asymmetric scaling of a portion of an OES based on a key space characteristic(s), such that resulting workloads can be distributed to available computing resources in a more tailored manner. Moreover, advanced scaling techniques can perform scaling intelligently to selectively burden a portion(s) of available computing resources according to a performance, capability, metric, etc., of an individual portion(s) of the available resources, e.g., adding an additional mid-range processor can result in a different scaling than adding another high-end processor. In an aspect, scaling can also be selectively deferred, wherein the deferral can reduce consumption of computing resources, e.g., committing a scaling event can consume computing resources so it can be desirable to scale in response to determining that the scaling would beneficial over and above any use of computing resources to commit the scaling event itself.

In contrast to conventional storage systems, the disclosed subject matter can relate to an OES data storage system based, priority-driven, event operation technology. The disclosed subject matter can be performed by an OES data storage system, rather than being performed by an external application, such as a client-based reader or writer application, etc. Moreover, the disclosed subject matter can operate in OES data storage systems that employ OES scaling or OES auto-scaling technologies. The disclosed subject matter can provide for storage of events based on an indicated event priority and access to the stored events based on the priority-based event storage order. As an example, in a sequence of one million (1M) events with a last event being the only event to have a higher priority than the remaining events, the disclosed subject matter can result in reading that last event earlier than a conventional stream storage system that doesn't employ priority based storage, that in this example, might not read the last event until all preceding 999,999 events have been read.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate event prioritization for an ordered event stream (OES), in accordance with one or more embodiments of the subject disclosure. System 100 can comprise a storage component 102 that can store an ordered event stream (OES) 110. OES 110 can store one or more events. An event is associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110 in an ordered manner according to the key. Similarly, events with a same key can be read from OES 110 in an ordered manner, e.g., in the order they were previously written into OES 110. Components providing events to be written can be termed 'writers' and components requesting events can be termed 'readers.' As such, a writer can provide an event that can be written to OES 110 in an ordered manner based on a key associated with the event. Similarly, a reader can receive an event from OES 110 based on a key.

Processor component 104 of a system 100 can receive write(s) 106 that can be written to OES 110 stored on storage component 102. Processor component 104 of a system 100 can provide access to events of OES 110 based on a key, e.g., as read(s) 107 that can be communicated to a reader. Generally, one processing instance, e.g., processor component 104, etc., is designated for writing events to a portion, e.g., segment, of OES 110. OES 110 can comprise one segment and/or parallel segments, e.g., stream segments, etc., that can store events according to a key. In an example embodiment, more than one processing instance writing to a segment of an OES can typically be disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. In an example embodiment, while more than one processing instance writing to a segment of an OES is typically disfavored, more than one processing instance reading from a segment can be fully supported, encouraged, etc. As such, for a given number of segments, in some embodiments, there can be up to the same number of processing instances, e.g., to limit more than one processor instance writing to a segment. Although adding more processing instances can be allowable, for example to increase read operations, these additional processing instances can be constrained to read operations to limit the possibility of scrambling an order of events being written to a segment. It is further noted that system 100 can comprise idle processing instances that are not reading or writing to the OES, for example, as reserve processing instances supporting failover operations protecting against an active processing instance becoming less responsive, in support of scaling events, etc. In one or more embodiments, keys of one or more segments of an OES can represent a key space for OES 110. Segments can therefore act as logical containers associated with a particular range of keys for a portion of an event stream and can be used to store events of OES 110. When a new event is written to a stream, it can be logically stored to a segment based on the event key regardless of where it is physically stored. In an example embodiment, the key space can be divided into a number of ranges that can correspond to the number of segments comprising an OES, e.g., OES 110. As an example, a key space for an OES can be from 0 to 100, the OES can comprise two parallel segments wherein the first segment can sequentially store events with, for example, keys from 0 to 30, and the second segment can sequentially store events with keys from >30 to 100. In this example, a first event with a key of 54 can be appended to the second segment, a second event with a key of 29 can be appended to the first segment, a third event with a key of 14 can be further appended to the first segment after the second event, etc. In an example embodiment, storage component 102 can store one or more OESs, although only OES 110 is illustrated for clarity and brevity.

OES 110, as illustrated in system 100, can be an overly simplistic example of an OES that can comprise just one segment for storing incoming event write(s) 106 and sourcing event read(s) 107, and therefore the key space of OES 110 can be embodied in the illustrated single segment of events, e.g., the key space of OES 110 is not illustrated as being distributed across more than one parallel event storage segment. OES 110 can have an origin terminus 112. Whereas the reader of this document is expected to understand that the OES represents a logical ordering of events actually stored on physical storage devices, the instant disclosure will generally simply refer to logically writing to an OES as writing to an OES for the sake of brevity. A first event can be written at origin terminus 112. The subsequent events can then be appended at an additive terminus 114 that is typically always at the head of the stream of written ordered events, e.g., a most recent event is written to the head of OES 110, which provides ordering of the events being written. This results in OES 110 allowing for continuous and unbounded data storage that can be a durable, elastic, append-only, unbounded sequence of events, e.g., an OES can logically represent events stored at any number of physical storage locations, e.g., spanning files, spanning disks, spanning data centers, etc. In an example, a $(K+1)^{th}$ event can be appended to the $K^{th}$ event of OES 110 at additive terminus 114. In an embodiment, storage component 102 can store any number of OESs. Moreover, any one OES can comprise any number of parallel segments, e.g., stings of events for a defined key space range. Each segment can comprise an ordered sequence of stored events.

In system 100, event priority insertion component (EPIC) 120 can facilitate adapting a topology of one or more OESs. In one or more embodiments, the adapting of the topology of OES 110 can accommodate storing events according to one or more event priorities. In an embodiment, EPIC 120 can enable generation of a key based on an event characteristic(s) and on an indicated priority value or default priority value. In a non-prioritization example, a hashed key, e.g., h(key) can be based on an event characteristic. In a corresponding prioritization example, the hashed key can be a prioritized hashed key (PHK), e.g., h(key, priority). Expanding on this example, where the key space can be from zero to one, and where there can be N priority ranges, e.g., PHK ranges, then PHK=priority*1/N+h(key)/N, which can reduce to (priority+h(key))/N. As such, for example, where N=2, e.g., there are priority levels zero and 1, then for an h(key) of 0.2 with a priority of 1, for example, PHK= (1+0.2)/2=0.6, and for the h(key) of 0.2 with a priority of 0, the PHK can be (0+0.2)/2=0.1. In this example, any event with a priority of 1 will have a resulting PHK of 0.5 to 1, and any event with a priority of 0 will have a resulting PHK of zero to 0.5. This can enable a reader to be associated with reading events with PHKs of 0.5 and above preferentially to reading events with PHKs less than 0.5, which can effectively result in reading events with higher priority preferentially to reading events with lower priority. It is noted that the example PHK function presented is simply illustrative and myriad other PHK functions can readily be described, all of which are to be considered within the scope of the instant disclosure despite not being explicitly recited for the sake of clarity and brevity. It is further noted that the use of the example PHK function can result in symmetric fragmentation of the hashed key space, e.g., there can be N equal sized priority ranges in the example PHK function. Certainly, it is to be appreciated that the priority ranges are not so limited and another PHK function that presents unequal priority space ranges can be readily selected or implemented as may be needed by an actual implementation of the presently disclosed subject matter.

In embodiments, EPIC 120 can further facilitate ordering reader(s) based on PHK ranges. Accordingly, a reader(s) can be affiliated with reading higher priority range events, e.g., events having higher PHKs can be read before reading events with lower PHKs. Moreover, readers, for example groups of readers, can be ordered such that some of the readers read higher PHK events prior to others of the readers reading lower PHK events. As an example, if first events of a first key and second events of a second key result in having higher PHKs than third events of the first key and fourth events of the second key, then a first reader can be assigned to read the first events and a second reader can be assigned to read the second events, which can both occur prior to a third and fourth reader reading the third and fourth events respectively based on further ordering by EPIC 120.

As is illustrated in system 100, events can be written, read, etc., based on the priority indicated for the event, e.g., the indicated priority can be employed in determining an PHK which, as illustrated, can be employed in writing the event according to the PHK value. In this regard, the 'priority' indicated for the event does not itself need to be stored, e.g., the priority is inherently incorporated in to the determined PHK for the corresponding event. Moreover, a reader can then sequentially read events having a same PHK to retrieve the events in the same order in which they were written and, as such, the priority and order are both preserved via the PHK determined at proximate to the time of writing the event to the OES. The events are written in the same OES, rather than via distinct OESs as well. Moreover, the priority is managed by the OES system, via EPIC 120, rather than by applications that, in some embodiments, might be outside the control of the OES system, which can aid in efficient management of the OES. Furthermore, the illustrated embodiment in system 100 can support scaling of the example OES, e.g., splitting go the space of h(key) propagates into determined PHKs of corresponding epochs.

Figure 2:
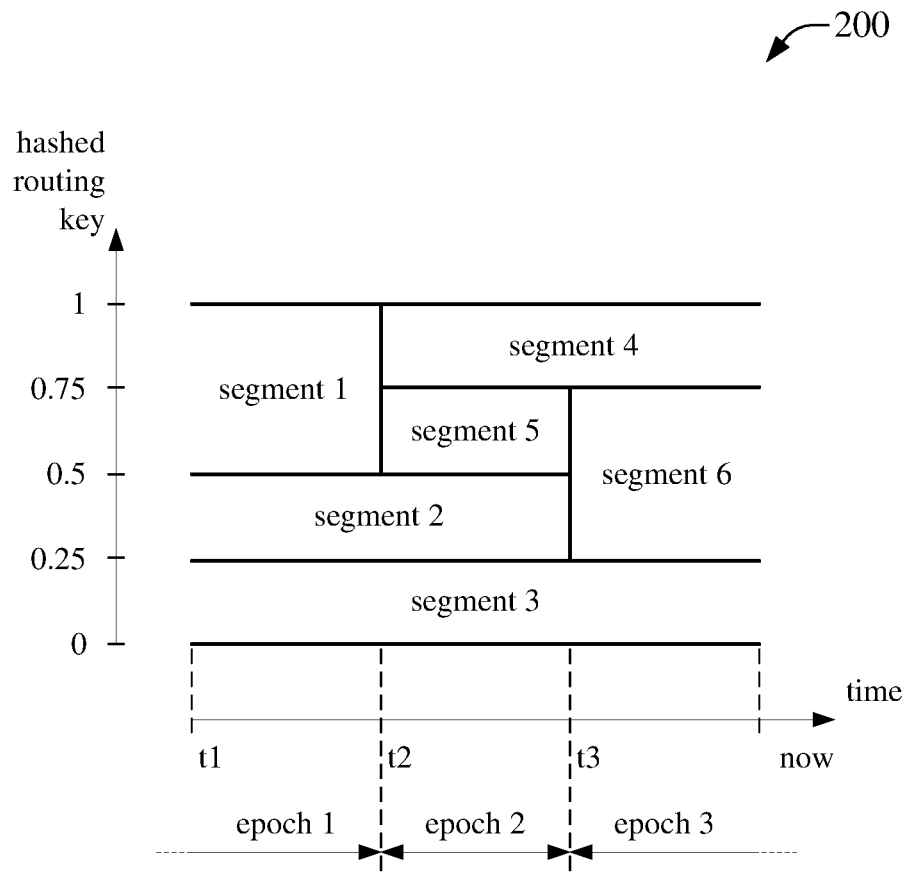
FIG. 2 is an illustration of an example system that can enable storing prioritized events via one or more epochs of an ordered event stream, in accordance with aspects of the subject disclosure.

FIG. 2 is an illustration of an example system that can support storing prioritized events via one or more epochs of an ordered event stream 200, in accordance with one or more embodiments of the subject disclosure. Ordered event stream 200 can comprise segments. At a first time, for example t1, OES 200 can comprise one or more parallel segments, e.g., segment 1, segment 2, segment 3, etc. At some point a segment can be scaled. As an example, at t2, segment 1 can be scaled up. This can result in causing segment 4 and segment 5 and correspondingly sealing segment 1. The topology of the OES comprising segments 1-3 pre-scaling can be designated as epoch 1. Similarly, the topology of the OES comprising segments 4-5 and 2-3 can be designated as epoch 2.

In an example embodiment, segments 2 and 3 can be continuous across epochs 1 and 2 while segment 1 can end at the transition from epoch 1 to 2. In an example embodiment, in epoch 1, events associated with a key between 0.5 and 1, e.g., 0.5>key≥1, can be written (and read from) segment 1, while in epoch 2, events associated with a key between 0.75 and 1, e.g., 0.75>key≥1.0, can be written (and read from) segment 4 and events associated with a key between 0.5 and 0.75, e.g., 0.5>key≥0.75, can be written (and read from) segment 5. As such, access to events for a given key can be associated with reads in different epochs. As an example, reading an event with a key of 0.8 can read from both segment 1 and segment 4. Where the read is from head to tail, the read of example events with a key of 0.8 can begin reading in segment 4 and then continue reading into segment 1 across the epoch boundary between epoch 2 and 1. Similarly, where the read is from tail to head, events associated with the example key of 0.8 can begin in segment 1 and continue into segment 4 across the epoch boundary. However, it is noted that generally no additional events are written into segment 1 after the scaling event is committed and a new epoch is begun.

In epoch 2, the topology of OES 200 can comprise segments 4-5 and 2-3. At some point further scaling can be undertaken, e.g., at t3. OES 200 can, for example, scale down by condensing segment 2 and 5 into segment 6 at t3. This example scaling down can reduce a count of segments comprising OES 200. The scaling at t3 can result in ending epoch 2 and beginning epoch 3. The example scaling can cayuse segment 6 and can close segments 2 and 5. As such, in epoch 3, the topology of the OES comprising segments 3-4 and 6 post-scaling can distribute the key space of OES 200, for example, as 0≤segment 3>0.25, 0.25>segment 6≥0.75, and 0.75>segment 4≥1.0.

In an example embodiment, where event prioritization is employed, the h(key) of events, e.g., keys between 0 and 1 in system 200, can be employed in determining PHKs, for example, as disclosed in relation to system 100. In an embodiment, the h(key) can be further processed in conjunction with an indicated priority value, with a default priority value, etc., to yield a PHK for an event. In another example, a PHK can be determined directly in a manner similar to determining an h(key) but further based on an indicated priority, default priority, etc., e.g., rather than determining an h(key) and then determining a PHK, the PHK can be determined directly, for example by EPIC 120, etc., based on an event characteristic(s) and a priority value. In some embodiments, the priority value can be determined from an event characteristic(s) as well, for example, where an event corresponds to a data structure that comprises a variable indicating a priority value and another variable indicating a manufacturing date, then an example PHK can be based on the priority value indicated in the data structure and on the manufacturing date indicated in the data structure and the event can for example have a payload indicating a process line image of the product. In this example, the manufacturer can employ real-time camera analysis to set a higher priority on products that are acceptable but that can be outside of a set parameter, for example, being more than 5% overweight. In this example, a corresponding photo of overweight products manufactured on the manufacturing date can then be read prior to photos of normal weight products on the same date, e.g., the overweight product events can have a higher priority in this example. Further, five readers can then be ordered to, for example, read high priority events for in parallel, e.g., one reader for each of Monday to Friday, then read the normal priority events for the same Monday to Friday, then advance to the next week in the OES. It can be readily appreciated that were there can be huge numbers of products manufactured by the example company, first reading high priority events can decrease an amount of time needed to reach these high priority events in comparison to writing unprioritized events. The example company can then undergo an increase in production, for example by activating an additional processing line, which can result in an increase in event writes and/or reads. Scaling of the OES can accommodate the increased computing resource demands that can be related to the example increase in production.

Where the above OES is scaled in relation to the indicated increase in manufacturing, the OES can be scaled to generate PHKs based on priority and process line for a given manufacturing date, e.g., an extra set of processors can be applied to the event workload coming from the additional process line that was activated in this example. In System 200, this can for example transition from segment 1 to segments 4 and 5, e.g., in epoch 1 before the increase in production, all events can be stored in segment 1 with placement in segment 1 being determined by priority, e.g., PHK, for example. However, in this example, scaling the OES in conjunction with the example increase in production can result in epoch 2, where more computing resources can support two segments, e.g., segments 4 and 5, which can each support PHK based storage, e.g., a resulting hashed key can be priority based but can also correspond to a narrower range of keys for each processing instance, which can reduce the computing resources in comparison to the processing instance managing the full increase in event operations without scaling. In an embodiment, the scaling can be automatic, e.g., auto-scaling of the OES, or portion thereof, is fully supported. In an example embodiment employing the above illustrated PHK function, segment one can store PHKs between 0.5 and 0.75 for a priority of zero and between 0.75 and 1.0 for a priority of one, while in epoch 2, segment 5 can store zero-priority (0-priority) events for both production lines and segment 4 can store one-priority (1-priority) events for both production lines. In this example embodiment, readers of a reader group can be affiliated with reading the 1-priority events from segment 4 prior to reading the 0-priority events from segment 5. In another example embodiment employing a different PHK function, segment one can store PHKs between 0.5 and 0.75 for a 0-priority and between 0.75 and 1.0 for a 1-priority, while in epoch 2, segment 5 can store 0-priority events for one production line and 1-priority events for the one production line, and segment 4 can store 0-priority events for a second production line and 1-priority events for the second production line. In this other example embodiment, readers of a reader group can be affiliated with reading the 1-priority events from first key spaces of both segments 4 and 5 prior to reading the 0-priority events from second key spaces of the same segments 4 and 5.

Figure 3:
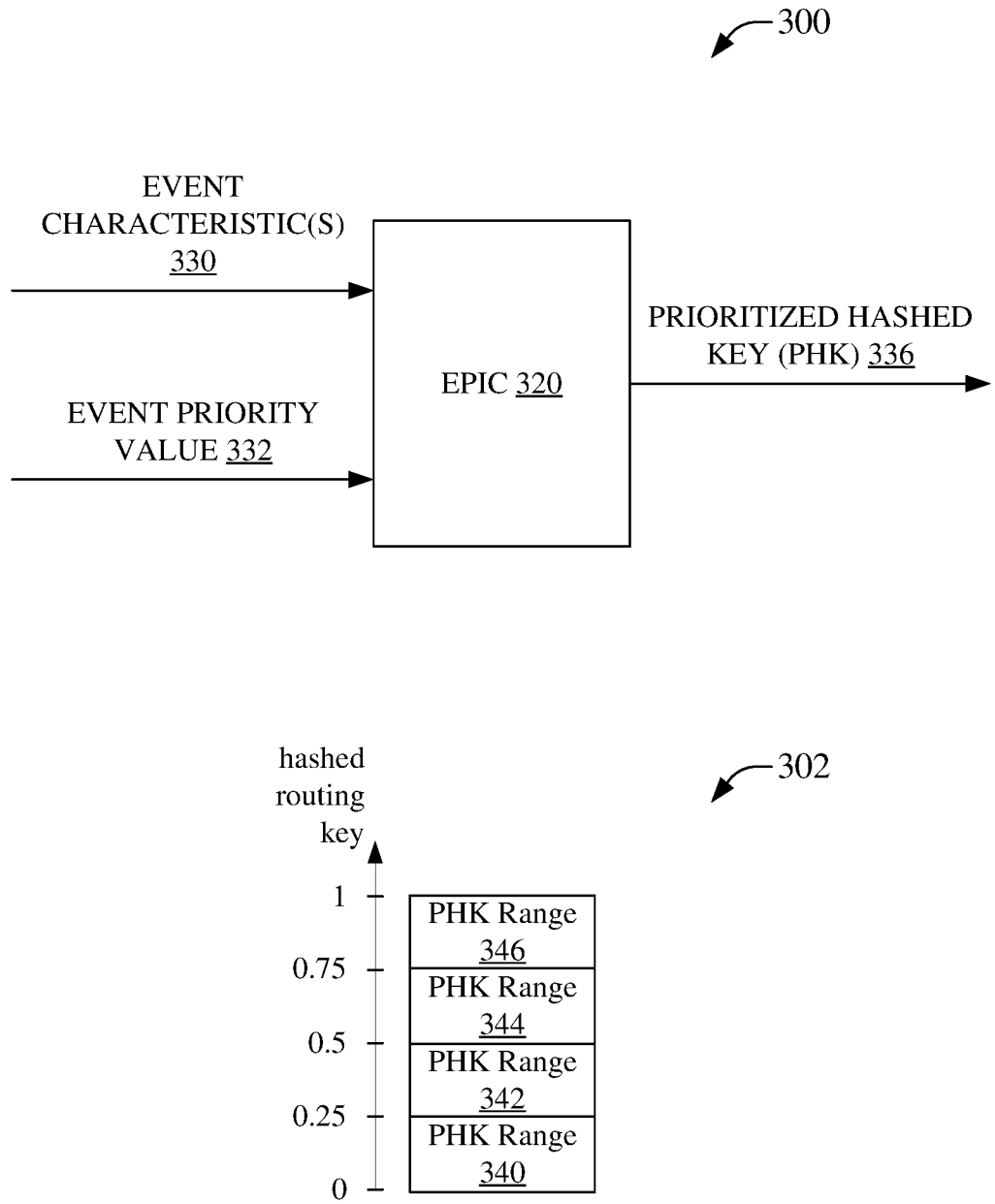
FIG. 3 illustrates an example system that can facilitate determining a prioritized hashed key (PHK) enabling event prioritization for an ordered event stream, in accordance with aspects of the subject disclosure.

FIG. 3 is an illustration of a system 300, which can facilitate determining a prioritized hashed key (PHK) enabling event prioritization for an ordered event stream, in accordance with one or more embodiments of the subject disclosure. System 300 can comprise event priority insertion component (EPIC) 320 that can be the same as, or similar to, EPIC 120. In an embodiment of the disclosed subject matter, EPIC 320 can received event characteristic(s) 330. Moreover, Epic 320 can receive event priority value 332. In an embodiment, EPIC 320 can receive more than one event priority value 332, e.g., there can be more than one priority value corresponding to event data to be stored via an OES event. As an example, event data can comprise flag values that can be interpreted as priority values, such as warning flags, error flags, customer ratings, or nearly any other type of flag value. In this example, for instance, event data can correspond to performance of an airliner, a key can be based on a flight number characteristic, and a priority can be based on one or more warning flag values, e.g., if an airliner warning occurs the corresponding event can be given a higher priority. In this example then, a warning flag can occur for out of specification engine performance, low cabin pressure, elevated tire temperatures, etc., any one or more of which can be employed to cause the event to have a higher priority than it otherwise would.

In various embodiments, event characteristic(s) 330 and event priority value 332 can be employed by EPIC 320 in determining PHK 336. As has been asserted herein above, PHK space can partition hashed key space based on one or more event priority values. As an example, all events can be of normal priority, e.g., the instant disclosure can collapse back to a key that is not based on a priority value. As a further example, some events can be of a first priority and other events can be of second priority, for example 0-priority and 1-priority as is employed in other example disclosed herein. The use of a first and second priority can evenly divide a key space, such as is disclosed for the hereinabove PHK function example, or can unevenly divide a key space. It is noted that the key space can logically represent physical storage and, as such, an evenly and unevenly divided key space can be of little to no consequence, e.g., the even dividing of the key space typically does not correlate to any limitation on actual physical storage space. In a further embodiment, multiple levels of priority can correspond to multiple divisions of the key space. As an example, four levels of priority can correspond to four PHK ranges in the hashed routing key space.

System 300 can generate PHK 336 that can correspond to a PHK range, for example, one or more of PHK ranges illustrated at key space 302. In a first example, the hashed routing key space between zero and one can be divided in to four PHK ranges 340-346 as illustrated at key space 302. In this first example, PHK range 340 can correspond to PHKs for first priority events of having a same event characteristic(s) 330. In this first example, PHK range 342 can correspond to those same event characteristic(s) 330 but for a second event priority value. Similarly, PHK range 344 can correspond to these same event characteristic(s) 330 but for a third event priority value and PHK range 346 can again correspond to those same event characteristic(s) 330 but for a fourth event priority value.

However, key space 302 can also represent an alternate example. In this second example, PHK range 340 can correspond to first event characteristics for a normal event priority value and PHK range 342 can correspond to second event characteristic(s) also for a normal event priority value. This second example can then further illustrate PHK range 344 as corresponding to the first event characteristic but for a second event priority value and PHK range 346 can correspond to second event characteristic(s) for the second event priority value. In this alternate example, the two lower PHK ranges, e.g., 340 and 342 can correspond to a same priority but for events having different characteristics, while the two higher PHK ranges, e.g., 344 and 346, can correspond to a second priority level for the same two groups of events.

As such, where a PHK function can be designed for a particular implementation, as is disclosed herein above, the corresponding hashed routing key space can be divided into nearly any topology of appropriate PHK ranges. As another example, PHK ranges 340, 342, and 344 can store 0-priority events of three different groups of event characteristic(s) while PHK range 346 can store 1-priority events for any of the three event groups corresponding to PHK range 340-344. Whereas it is generally more clear and concise to discuss the PHK ranges as evenly dividing a key space, the remaining examples provided herein will generally conform to that topology, although nearly any PHK range topology is to be considered within the scope of the instant disclosure despite not being further discussed at any length simply for the sake of clarity and brevity. Where some alternate topology is insightful, such topology will be explicitly, or implicitly, indicated in an appropriate example herein.

Figure 4:
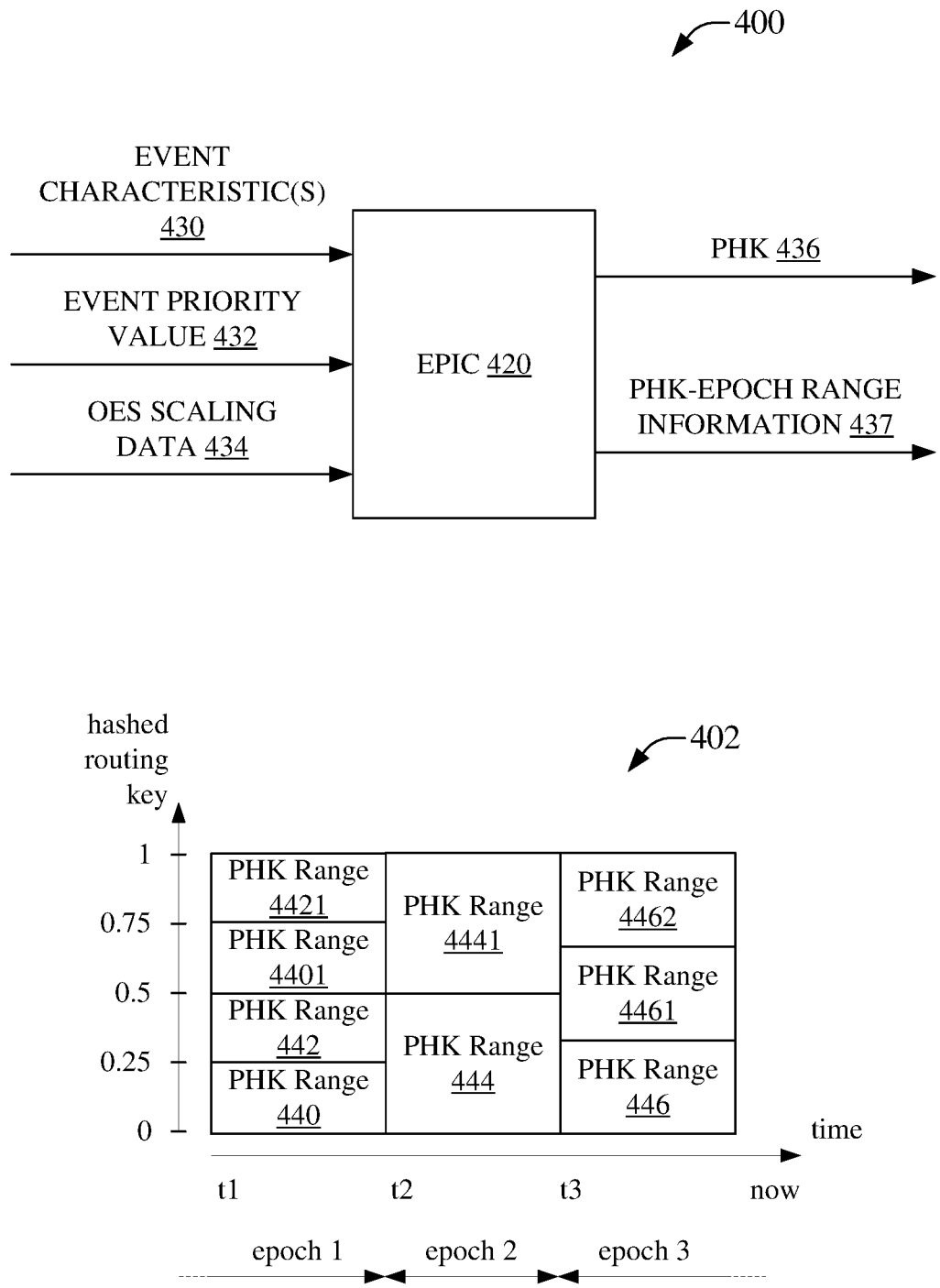
FIG. 4 is an illustration of an example system that can enable event prioritization based on a prioritized hashed key via one or more epochs of an ordered event stream, in accordance with one or more embodiments of the subject disclosure.

FIG. 4 is an illustration of a system 400 that can enable event prioritization based on a prioritized hashed key (PHK) via one or more epochs of an ordered event stream, in accordance with one or more embodiments of the subject disclosure. System 400 can comprise EPIC 420 that can be the same as, or similar to EPIC 120, 320, etc., as disclosed herein above. EPIC 402 can receive event characteristic(s) 430, one or more event priority value 432, and OES scaling data 434. PHK 436 can be determined based on event characteristic(s) 430 and event priority value 432 by EPIC 420 in the same or similar manner as already disclosed elsewhere herein. In an embodiment, PHK-epoch range information 437 can be determined by EPIC 420, based on OES scaling data 434 and one or more of event characteristic(s) 430, one or more event priority value 432, or PHK 436.

As illustrated at 402, division of a hashed routing key space can be different across different OES epochs. As an example, in key space 402, epoch 1 can comprise four PHK ranges, epoch 2 can comprise two PHK ranges, and epoch 3 can comprise three PHK ranges. Whereas an epoch change occurs with OES scaling events, the different PHK range topologies illustrated can also correspond to OES scaling events. In an example, an OES stream can begin with two segments that can each store events with different characteristics, such as rideshare service data for city A and for city B, these can, in this example, correlate to PHK range 440 and 442 correspondingly. There can be events having an increased priority in each example city, which events can correspondingly be stored according to PHK ranges 4401 and 4421, e.g., a 0-priority city A event can be stored according to PHK range 440, a 0-priority city B event to PHK range 442, a 1-priority city A event to PHK range 4401, and a 1-priority city B event to PHK range 4421.

At t2 of 402, the count of events can decrease to a level that the OES determines to undergo an auto-scaling event, for example, combining events of city A and B into a segment for region C. Whereas there can still be two levels of priority for events of region C in epoch 2, PHK range 444 can store, for example, 0-priority events for region C and PHK range 4441 can store 1-priority events for region C. A reader instance reading from t1, e.g., in epoch 1, can read according to PHK-epoch range information 437 that can be based on the topology of key space 402 in epoch 1, e.g., can be determined from OES scaling data 434 and one or more of event characteristic(s) 430, one or more event priority value 432, or PHK 436. The transition to epoch 2 at t2 can be associated with a change in PHK-epoch range information 437 that can enable a reader to read events according to the kay space 402 topology of epoch 2.

At t3, a changed topology for key space 402 can be based on a change to prioritization rather than to scaling event. In this example, for epoch 3, region C can remain as in epoch 2, however an additional priority level can be implemented, e.g., rather than 0- and 1-priority at each of epoch 1 and epoch 2, at epoch 3 there can be 0-, 1-, and 2-priority for region C events. Accordingly, PHK range 446 can correspond to 0-priority region C events, PHK range 4461 to 1-priority region C events, and PHK range 4462 to 2-priority region C events, in the illustrated example. PHK-epoch range information 437 can reflect this change in key space 402 topology, illustrated as epoch 3 for simplicity even though it can be considered as unrelated to a change in OES scaling, e.g., OES scaling data 434 can remain unchanged from epoch 2, however, the event characteristic(s) 430, one or more of event priority value 432, or PHK 436 resulting from the changing in the number of priority levels can be reflected in PHK-epoch range information 437 for this example.

Figure 5:
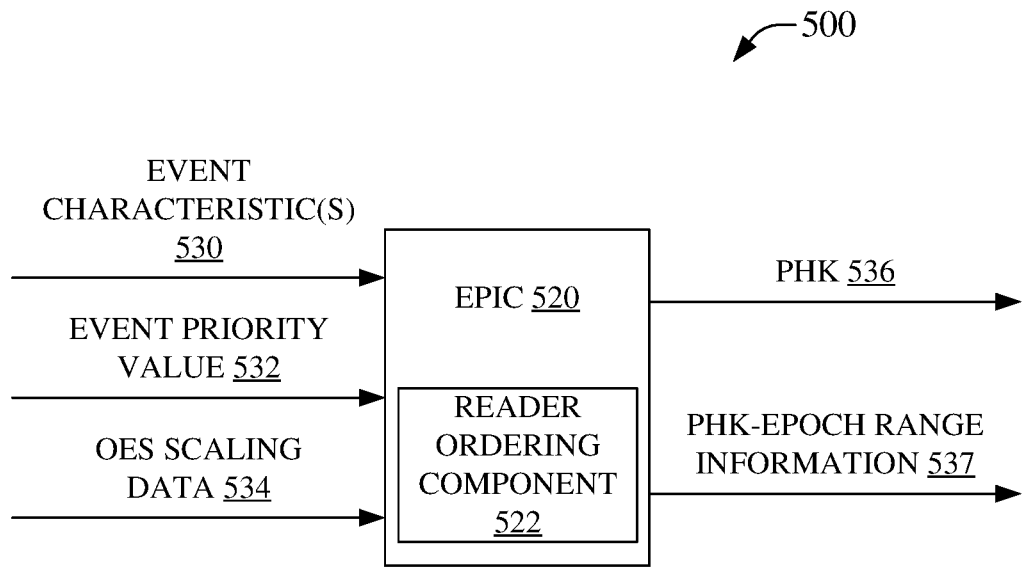
FIG. 5 is an illustration of an example system enabling reader ordering for prioritized events of an ordered event stream, in accordance with one or more embodiments of the subject disclosure.
Figure 5:
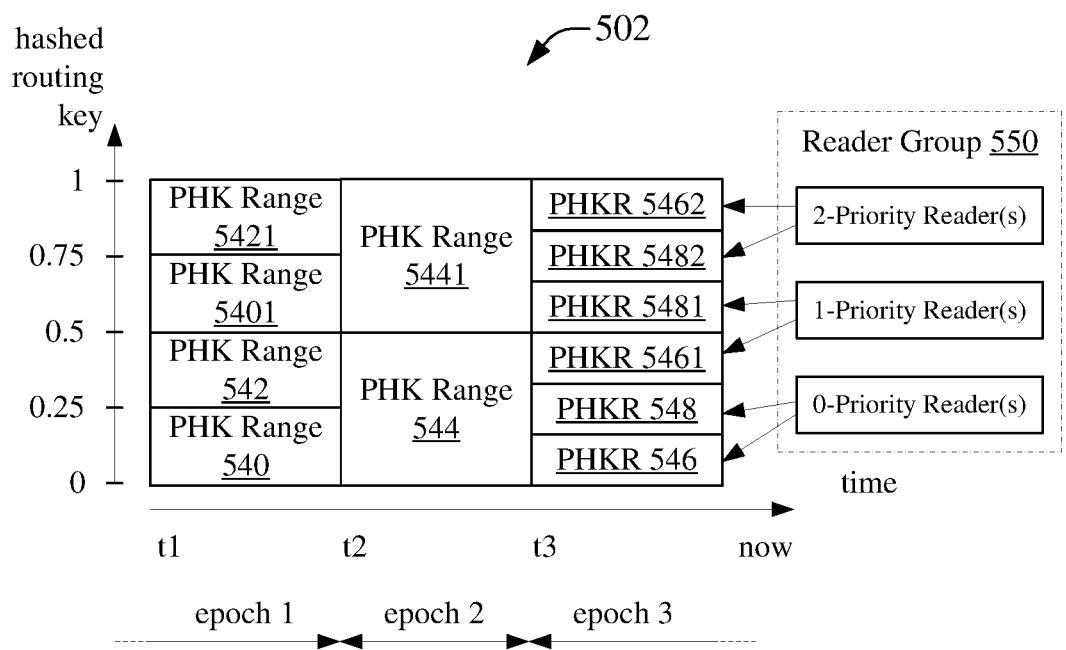

FIG. 5 is an illustration of a system 400 that can enable reader ordering for prioritized events of an ordered event stream, in accordance with one or more embodiments of the subject disclosure. System 500 can comprise EPIC 520 that can be the same as, or similar to EPIC 120, 320, 420, etc. EPIC 502 can receive event characteristic(s) 530, one or more event priority value 532, and OES scaling data 534. PHK 536 can be determined based on event characteristic(s) 530 and event priority value 532 by EPIC 520 in the same or similar manner as already disclosed elsewhere herein. In an embodiment, PHK-epoch range information 537 can be determined by EPIC 520, based on OES scaling data 534 and one or more of event characteristic(s) 530, one or more event priority value 532, or PHK 536.

As illustrated at key space 502, similar to key space 402 of FIG. 4, division of a hashed routing key space can be different across different OES epochs and whereas an epoch change occurs with OES scaling events, the different PHK range topologies illustrated can also correspond to OES scaling events. Further, as discussed elsewhere herein, a change in PHK-epoch range information 537 can relate to a change in the count of priority values for a key space and, therefore, in some circumstances can be unrelated to a scaling event, for example, the transition from epoch 2 to epoch 3 in key space 502. While an epoch change is more accurately associated with a scaling event, the alteration of the count of priorities can appear to have a similar effect on a topology of the key space and thus, in this limited sense, is also illustrated as a change in epoch despite being, in this example, unrelated to a scaling event.

System 500 can further comprise reader ordering component 522 that can enable ordering of reader applications, for example, reader applications of reader group 550. Typically, in OES embodiments without prioritization, stream segments can be distributed between reader applications randomly. However, where random distribution is employed in OES embodiments employing prioritization, there is a possibility that readers of a reader group can end up having all readers applied to events of highest priority key spaces. To avoid this, an OES data storage system can favor assignment of a reader to segments corresponding to abutting PHK ranges for example, as illustrated for the readers of reader group 550, e.g., the 2-priority reader is assigned to reading PHK range (PHKR) 5462 and PHKR 5482 that correspondingly can be 2-priority readers of PHKR 546 and PHKR 548. Similarly, the 1-priority readers of reader group 550 can be assigned, e.g., via reader ordering component 522, to reading the 1-priority events corresponding to PHKR 546 and PHKR 548, and the 0-priority readers can be assigned to read PHKR 546 and PHKR 548. Reader ordering component 522 can based ordering on one or more of event characteristic(s) 530, one or more of event priority value 532, or PHK 536, e.g., where these values can be employed in determining PHK-epoch range information 537, similar information can be employed in assigning an order to readers that operate in key space topology reflected in PHK-epoch range information 537.

As such, when system 500 serves a read request from a reader, system 500 can avoid mixing events from all the segments assigned to the reader and rather can mix events from higher priority segments before advancing to a next lower priority group, e.g., when there are no event in the higher priority group, e.g., 2-priority group readers, then system 500 can allow reads from 1-priority reader(s), then when those are depleted, can allow reads from 0-priority reader(s). Additionally, by ordering tone or more reader(s), for example, in reader group 550, according to priorities, the resultant output of the readers can inherently reflect prioritization and therefore can be directly employed by an operating system (OS) supporting execution of a reader application. This can avoid having to communicate priority values to an OS to scheduling/dispatch more conventional readers as separate tasks. Where the prioritization is set by the ordering of reader groups by EPIC 520, the inherent prioritization of the readers can be viewed as a type of traditional priority-driven scheduling, real-time scheduling, etc. As such, any OS can treat all reader operations with a same priority, e.g., the reader operations are scheduled via EPIC 520 and, as such, the sequence of read operations is already inherently ordered by system 500 and an OS supporting a reader application can be ignorant of ordering reader operations and can treat each reader operation as having a same OS priority. However, in some embodiments, a reader can communicate a priority to an OS to enable the OS to take over organizing a sequence of reader operations, e.g., 2-priority reader(s) can communicate that they correspond to reading higher priority events than 1-priority readers, etc.

In an example of system 500, 1,000,000 events can be written to an OES that has 1000 segments, e.g., each segment gets 1000 events. The OES can be read by a reader group with 100 reader instances, e.g., each reader instance can read 10 segments. Under low load conditions, the reading can occur without significant delay, e.g., the stream can be read out very quickly and event priority can have minimal practical effect. However, under high load conditions, processing of reading each event can be slow enough that prioritization can have a noticeable effect. In this example, all events, except a last event, can have a 0-priority, while that last event can have a higher priority, e.g., 1-priority. In an OES not employing prioritization of events, all 1 million events need to be read in order, meaning that the 1-priority event will be read only after the previous 999,999 0-priority events are read. It is apparent that this could be problematic where reading an event consumes any substantial time, e.g., a 10-millisecond read operation time would result in reading the high priority event after about 7 days. As such, prioritization can be beneficial. However, prioritization is less impactful under low load conditions, e.g., where a read operation can, for example, consume 100 nanoseconds, then all 1 million events can be read out in approximately $\frac{1}{1000}^{th}$ of a second, which is less likely to be a problematic delay in to reading the high priority event. It is noted that where this delay is impactful, or where there is a higher loading and thus slower read operation time, prioritization can be quite useful. Returning again to the 10-millisecond read operation time, and also noting that prioritization can result in a reader being assigned to read higher priority events first, then the one high priority event can be read in no more than 10 seconds in comparison to the above determined roughly 7 days, because the high priority event will be in one segment read by one reader and that segment will contain no more than 1000 events. Typically, because there is only one high priority event, this event will be read first, and thus a result under these conditions can be expected in about 10 milliseconds rather than 7 days.

Figure 6:
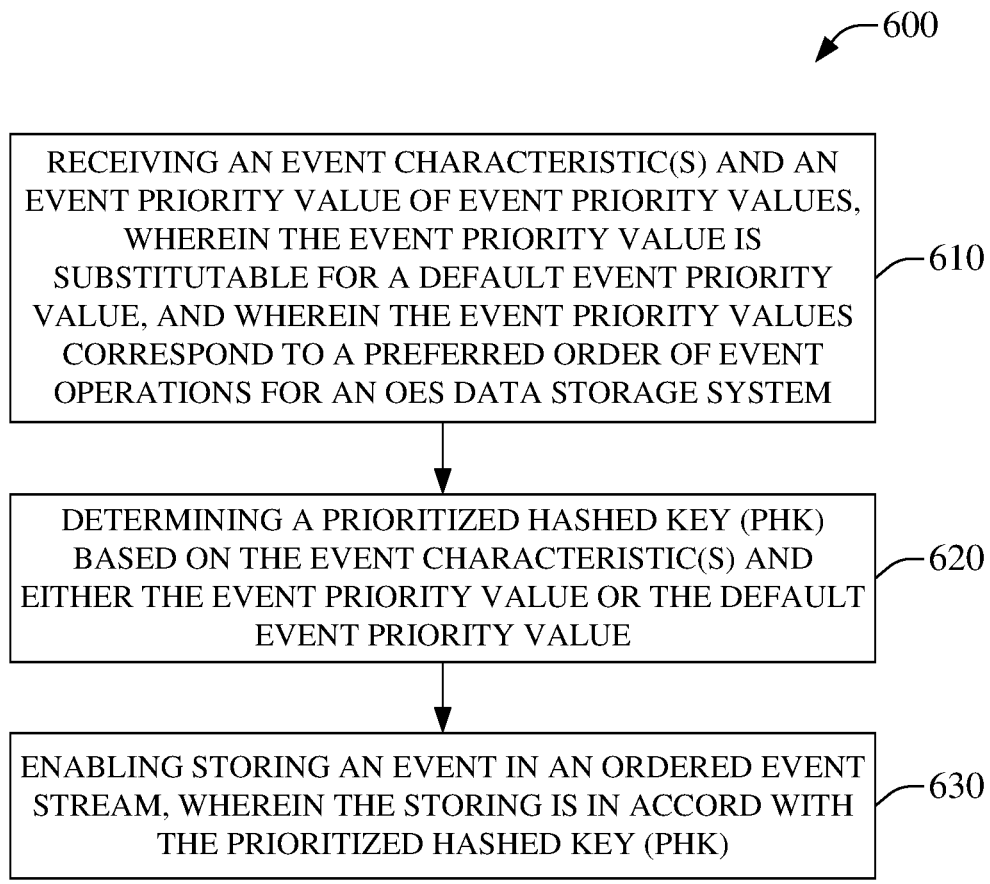
FIG. 6 is an illustration of an example method enabling event prioritization for an ordered event stream, in accordance with one or more embodiments of the subject disclosure.
Figure 7:
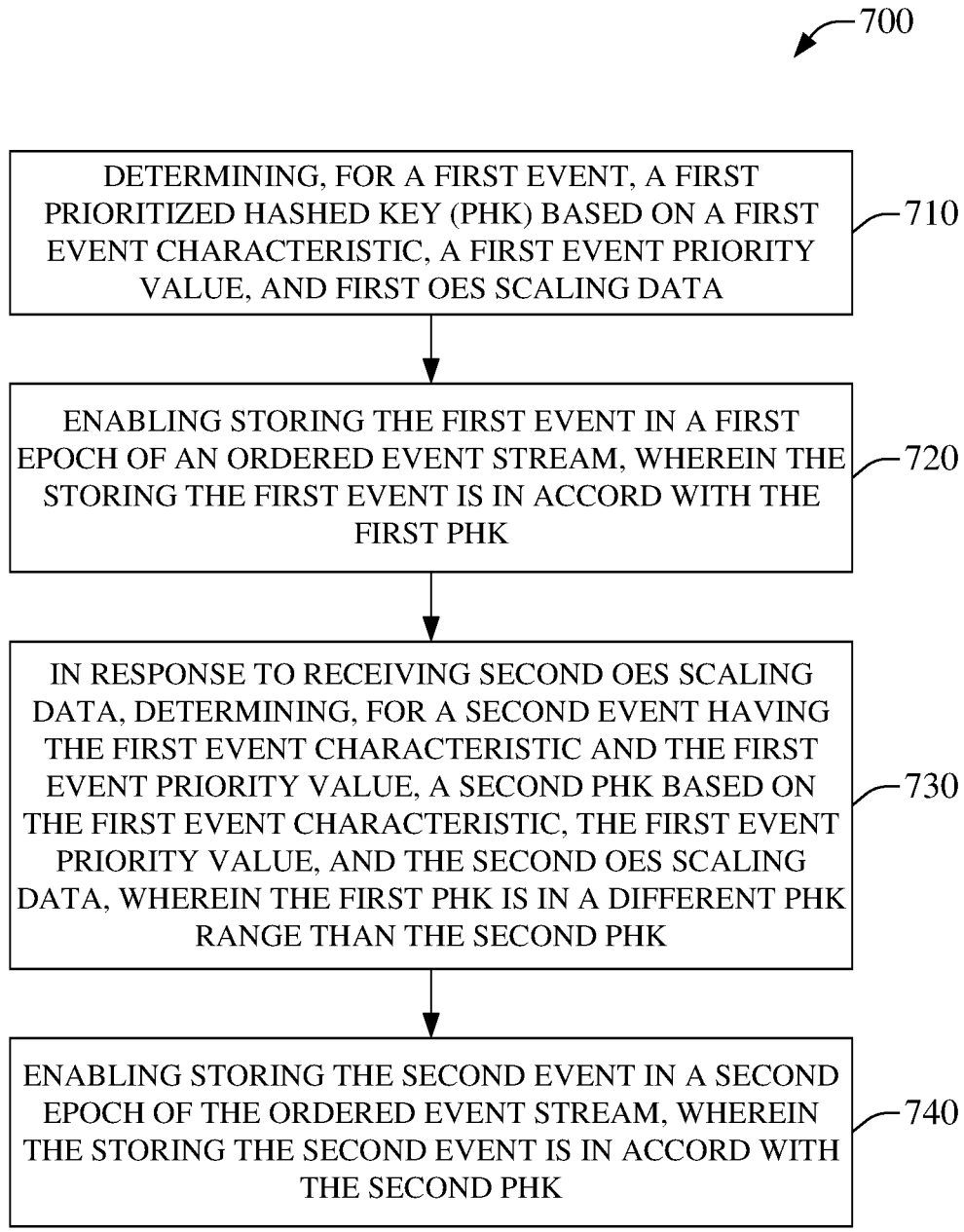
FIG. 7 is an illustration of an example method facilitating event prioritization via prioritized hashed key ranges in different ordered event stream epochs, in accordance with one or more embodiments of the subject disclosure.
Figure 8:
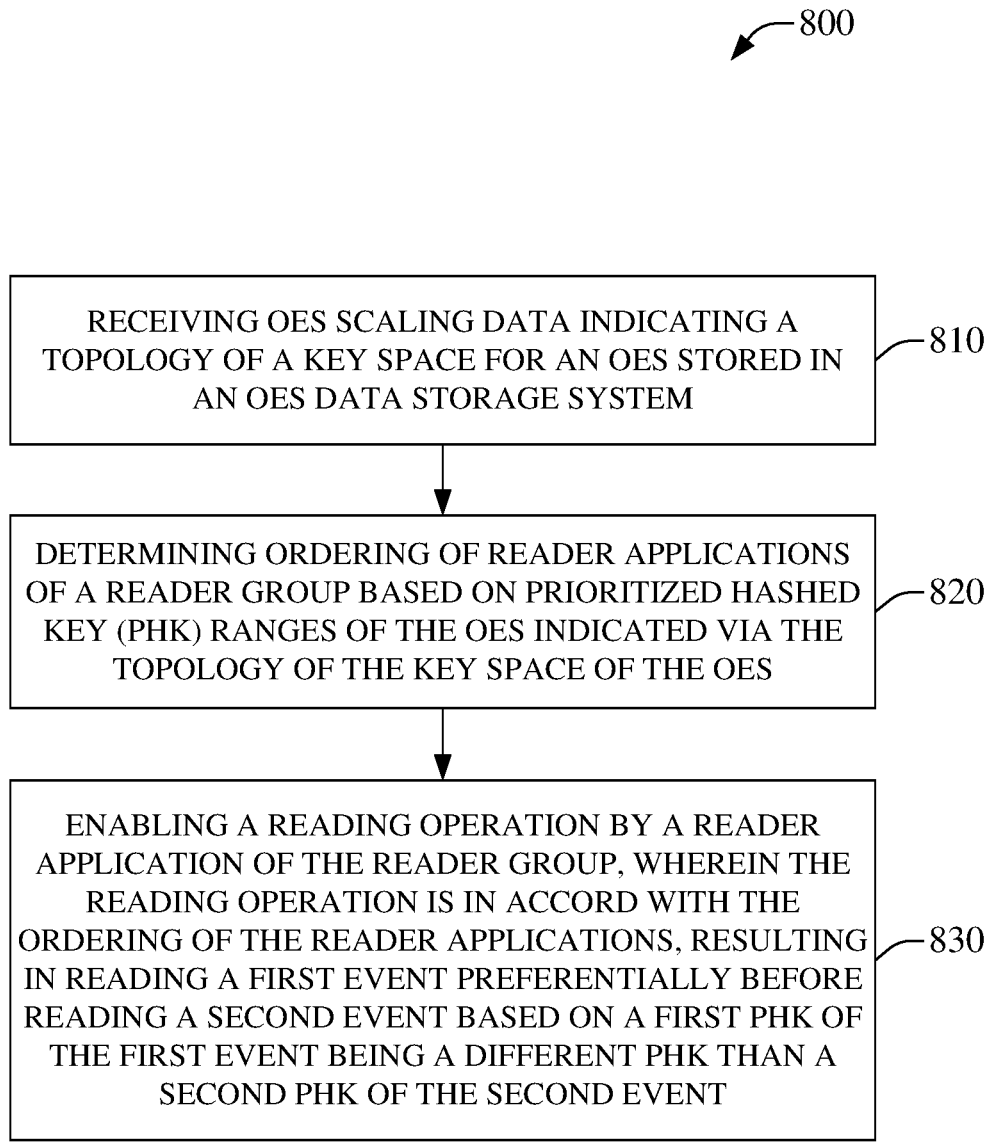
FIG. 8 is an illustration of an example method facilitating ordering of reader applications for reading events stored according to prioritized event key ranges of an ordered event stream, in accordance with one or more embodiments of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more processes, operations, acts, etc. herein described. It should be further appreciated that the example methods disclosed throughout the subject specification are capable of being stored on an article of manufacture (e.g., a non-transitory computer-readable medium) to allow transporting and transferring such methods to computers for execution, and thus implementation, by a processor or for storage in a memory.

FIG. 6 is an illustration of an example method 600, which can facilitate event prioritization for an ordered event stream, in accordance with one or more embodiments of the subject disclosure. Method 600 can comprise receiving an event characteristic(s) and one or more event priority values at 610. In an embodiment, event creation can include use of a default priority value, for example, all new events being written can be, by default, 'normal priority' events unless an indication of being other than the default priority is received. As such, the event priority value can be substituted for a default event priority value in these embodiments. As has been disclosed elsewhere herein, an event priority value can correspond to a preferred order of event operations for an OES data storage system, e.g., a higher priority value event can be preferentially read prior to a comparatively lower priority value event.

Method 600 can comprise, at 620, determining a prioritized hashed key (PHK) based on the event characteristic(s) and the event priority value. In embodiments employing a default event priority value, receiving a null event priority value at 610 can result in use of the event characteristic(s) and the default event priority value in determining the PHK. As an example, a default event priority can be 0-priority and, a priority sensitive hashing function can be employed to determine a PHK value, see for example, discussion in relation to system 200. The hashing function can use the default and the characteristic(s) to determine a PHK for the event. In this example, the hashing function can use a received event priority value in place of the default. As such, in this example, an indication that an event is 1-priority can result in determining a PHK based on the event characteristics and the 1-priority value.

At 630, method 600 can comprise, enabling storing an event according to the PHK determined at 620. At this point method 600 can end. The event can be stored in a PHK range of an ordered event stream, such as can be illustrated in systems 300, 400, 500, etc. The PHK range can correspond to the prioritization sensitive hashing function employed in some corresponding epoch of the OES. As an example, hashed key space 302 of FIG. 3, can illustrate in one embodiment a single segment of an OES having four priority levels, e.g., 0-, 1-, 2-, and 3-priority corresponding to PHK ranges 340, 342, 344, and 346. In an alternative example embodiment, hashed key space 302 of FIG. 3, can illustrate two segments of an OES each having two priority levels, e.g., a 0-, and 1-priority for Segment A corresponding to PHK ranges 340 and 344, and a 0-, and 1-priority for Segment B corresponding to PHK ranges 342 and 346. Numerous other examples can be readily appreciated although they are not expressly presented for the sake of brevity, however, all such PHK range distribution examples are nonetheless considered within the scope of the instant disclosure.

In an embodiment, method 600 can support determining a hashed key for an event where the key is in part based on a priority indicated for the event. This can differ from conventional methods, for example, it can be performed by a component of an OES data storage system rather than being the purview of external applications, e.g., the priority is passed into the OES by a writer and the OES then determines an event PHK as part of writing the event to the stream. As such, the OES operator can have direct control over prioritization features rather than directing external applications to act in a manner than indirectly comports with OES prioritization policy. Moreover, an event PHK can inherently reflect an event's priority such that the priority value itself does not need to be retained after the PHK is determined, which can reduce storage overhead. Further, inherent priority can enable any ready application to read events of a designated PHK, which can enable orchestration of reader applications to read events by priority without specifically enabling some priority determining feature in the reader application. In an example, by writing events in a manner that inherently reflects event prioritization, then reading according to the written sequence also can inherently result in access events in a manner that reflects the event prioritization, e.g., the disclosed subject matter can write each of D-A-B-E-C-F in alphabetical order as 'ABCDEF,' which can enable any reader to read 'ABCDEF,' in contrast to a more conventional system where 'DABECF' can be written in conjunction with priority data 'dabecf,' causing a reader to determine priorities from 'dabecf' in order to successfully read out 'ABCDEF' from 'DABECF.' The inherent incorporation of prioritization in events of the instant disclosure provides appreciable improvements over conventional techniques. Still further, the presently disclosed subject matter can remain functional across epoch changes that can result from scaling events or changes to priority level topology, e.g., because an event according to the instant disclosure is just an event, albeit inherently including prioritization, then scaling can occur in a same manner as can be applicable to a non-prioritization sensitive OES data storage system, and prioritization can remain functional regardless of the scaling of the OES, OES segment, etc.

FIG. 7 is an illustration of an example method 700, which can facilitate event prioritization via prioritized hashed key ranges in different ordered event stream epochs, in accordance with one or more embodiments of the subject disclosure. At 710, method 700 can comprise determining a first PHK for a first event. The first PHK can be based on a first event characteristic, a first event priority value, and first OES scaling data. First OES scaling data can indicate a key space topology, a change in key space topology, etc. As an example, an OES can comprise one segment with one level of priority, e.g., all events have the same priority. In this example, the OES can be scaled to two segments, e.g., going form a first epoch to a second epoch. The example two segments of the second epoch can correspond to a different key space topology, e.g., in the first epoch the one segment can cover keys from zero to one, while in the second epoch a first segment can cover from zero to 0.5 and a second segment can cover from 05 to one. This example change in OES topology can be indicated via OES scaling data.

In another example, an OES can again comprise one segment with one level of priority, e.g., all events have the same priority. In this next example, an additional priority level can be added to the one segment of the OES, e.g., the events of the one segment can now be of 0-priority or 1-priority. The key space can be accordingly divided, for example based on a corresponding priority sensitive hashing function, e.g., high priority events can be stored in a different park of the key space than similar events with lower priority, which can be regarded as a change in the OES topology. The change in the topology can be regarded as an epoch change even though it may not be directly attributable to a scaling event as would typically be associated with an epoch change. Examples of the use of an epoch change based on a change in count of prioritization levels can be found elsewhere herein, for example in discussion of key space 402, 502, etc. As such, this example change in OES topology can also be indicated via OES scaling data.

Method 700, at 720, can comprise enabling storing the first event in a first epoch of an ordered event stream, wherein the storing the first event is in accord with the first PHK. This can be similar to writing an event in an existing epoch of an OES, as has been disclosed throughout the instant disclosure. In an example, a first event can be written according to a first priority to an OES stream in accordance with a first OES stream hashed key space topography.

At 730, method 700 can comprise determining a second PHK for a second event. This determining can be in response to an indication of a second OES scaling data. As an example, an OES can undergo an epoch change and this can be indicated via the second OES scaling data. Accordingly, in this example, a next event, e.g., the second event, can be written according to the second event characteristics, the second event priority, and the second OES scaling data. It is noted that the second event characteristics can be the same as the first event characteristics, and that the second event priority can be the same as the first event priority. As such, at 730, the second PHK can be different than the first PHK because of the second OES scaling data, e.g., if the first and second OES scaling data, the first and second event characteristics, and the first and second event priority were all the same, then the first and second PHK can typically be expected to be the same. However, in example method 700, even though the event characteristics and priorities remain the same for the first and second events, the PHKs can be different because the hashed key space can have changed as would be indicated by the second OES scaling data being different than the first OES scaling data. As such, the first and second PHKs being different can be indicative of a change in the OES hashed key space topology, e.g., a scaling operation has occurred, a change in priority levels has occurred, etc.

Method 700, at 740, can comprise enabling storing the second event in a second epoch of the ordered event stream, wherein the storing the second event is in accord with the second PHK. At this point method 700 can end. Where the first and second event both have the first event characteristics and both have the first event priority, then the different PHKs can result from a hashed key space change, which can be regarded as transitioning from a first OES epoch to a second OES epoch. Accordingly, the second event can be written in the second epoch in accord with the second PHK. Method 700 can illustrate that the prioritization techniques disclosed herein can be functional in scalable OES data storage systems.

FIG. 8 is an illustration of an example method 800, which can enable ordering of reader applications for reading events stored according to prioritized event key ranges of an ordered event stream, in accordance with one or more embodiments of the subject disclosure. At 810, method 800 can comprise receiving OES scaling data indicating a topology of a key space for an OES stored in an OES data storage system. This OES scaling data can, in some embodiments, further indicate a change in key space topology, a change in a count of priority levels represented in the key space, etc. Events can be stored in an OES in accord with the hashed key space topology. As such, the topology of the hashed key space can correspond strongly to ordering of events and to an event priority As an example, for a hashing function of PHK=(priority+h(key))/N for N=2 and an h(key) of 0.2, then an event of 0-priority can have a PHK of (0+0.2)/2=0.1 and another event having the same h(key) but a 1-priority can have a PHK of (1+0.2)/2=0.6. As such, the difference in priority can have a significant impact on where in a key space an event is written. Accordingly, associating a reader(s) with a range of keys, e.g., a PHK range, can result in reading events associated with relevant PHKs and thus, of certain event characteristic(s) and priorities.

At 820, method 800 can comprise determining ordering of reader applications of a reader group based on prioritized hashed key (PHK) ranges of the OES indicated via the topology of the key space of the OES. Where OES scaling data can indicate an OES topology, e.g., features of an OES key space, the ordering of readers to selected portion of the key space can result in those readers returning events corresponding to the PHKs of the relevant portion of the hashed key space. Returning to the above example, assigning a first reader to PHKs>0.5 and a second reader to PHKs<0.5 can result in the first reader returning the 1-priority event and the second reader returning the 0-priority event. Similarly, where the first reader is tasked with reading PHKs>0.5 before advancing to PHKs<0.5, the first reader will return higher priority events before returning lower priority events in the above example.

Method 800, at 830, can comprise enabling a reading operation by a reader application of the reader group. At this point method 800 can end. Where the readers of a reader group have been ordered based on PHKs ranges, the readers can return events according to that ordering without the readers themselves needing to do any determination of prioritization. Much as other methods describe writing events to inherently comprise an event priority in a PHK value, the ordering of readers by an OES data storage system enables the use of less sophisticated reader applications than might otherwise be needed to deduce event priorities. In the instant disclosure, the organization of events by PHK can result in a reader performing a read operation for a range of PHK keys and returning higher priority events automatically due to the higher priority being inherent in the PHK ordering of the event when it was written to the OES. Also, as before, this can move control of prioritization to the OES data storage system rather than to external applications, such as client reader applications. In an embodiment, the reading operation is typically in accord with the ordering of the reader applications, resulting in reading a first event preferentially before reading a second event based on a first PHK of the first event being a different PHK than a second PHK of the second event.

Figure 9:
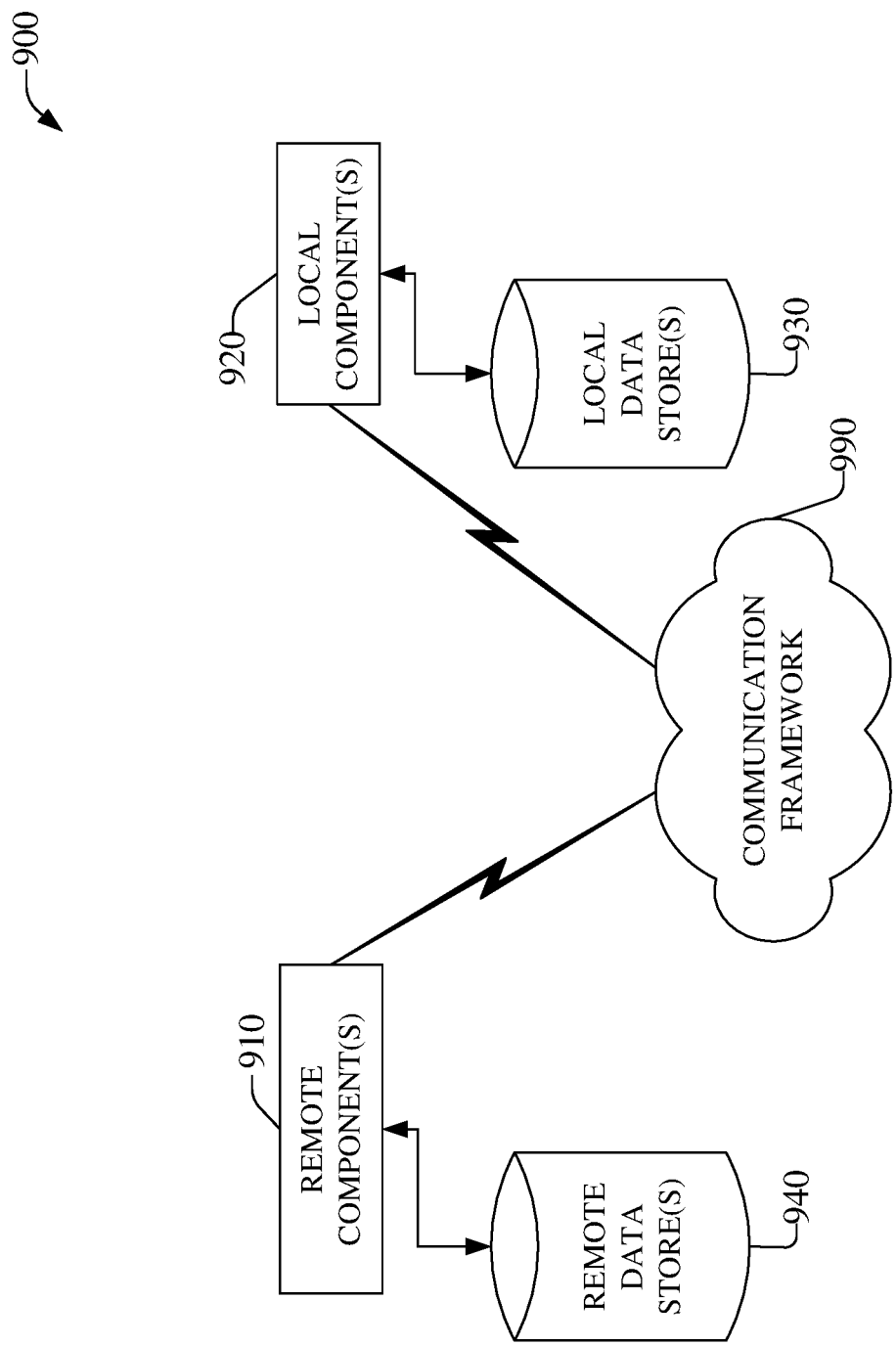
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, a remotely located processor device comprised in storage component 102, etc., a remotely located device supporting an application instance, e.g., a reader application instance, a writer application instance, etc., corresponding to write(s) 106, read(s) 107, etc., EPIC 120, 220, 320, 420, 520, etc., or other component connected to a local component via communication framework 990. Communication framework 990 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, etc., a locally located device supporting an application instance, e.g., a reader application instance, a writer application instance, etc., corresponding to write(s) 106, read(s) 107, etc., EPIC 120, 220, 320, 420, 520, etc., or other component local in an OES data storage system.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 940, such as a hard drive, solid state drive, SIM card, device memory, etc., that can be employed to store information on the remote component(s) 910 side of communication framework 990. Similarly, local component(s) 920 can be operably connected to one or more local data store(s) 930, that can be employed to store information on the local component(s) 920 side of communication framework 990. As examples, EPIC 120, 220, 320, 420, 520, etc., can communicate prioritization information, e.g., PHK 336, 436, 536, PHK-epoch range information 437, 537, etc., or other information via communication framework 990 among components of an OES storage system 100, 200, 300, 400, 500, etc., e.g., to facilitate prioritization of events of the OES, as disclosed herein.

Figure 10:
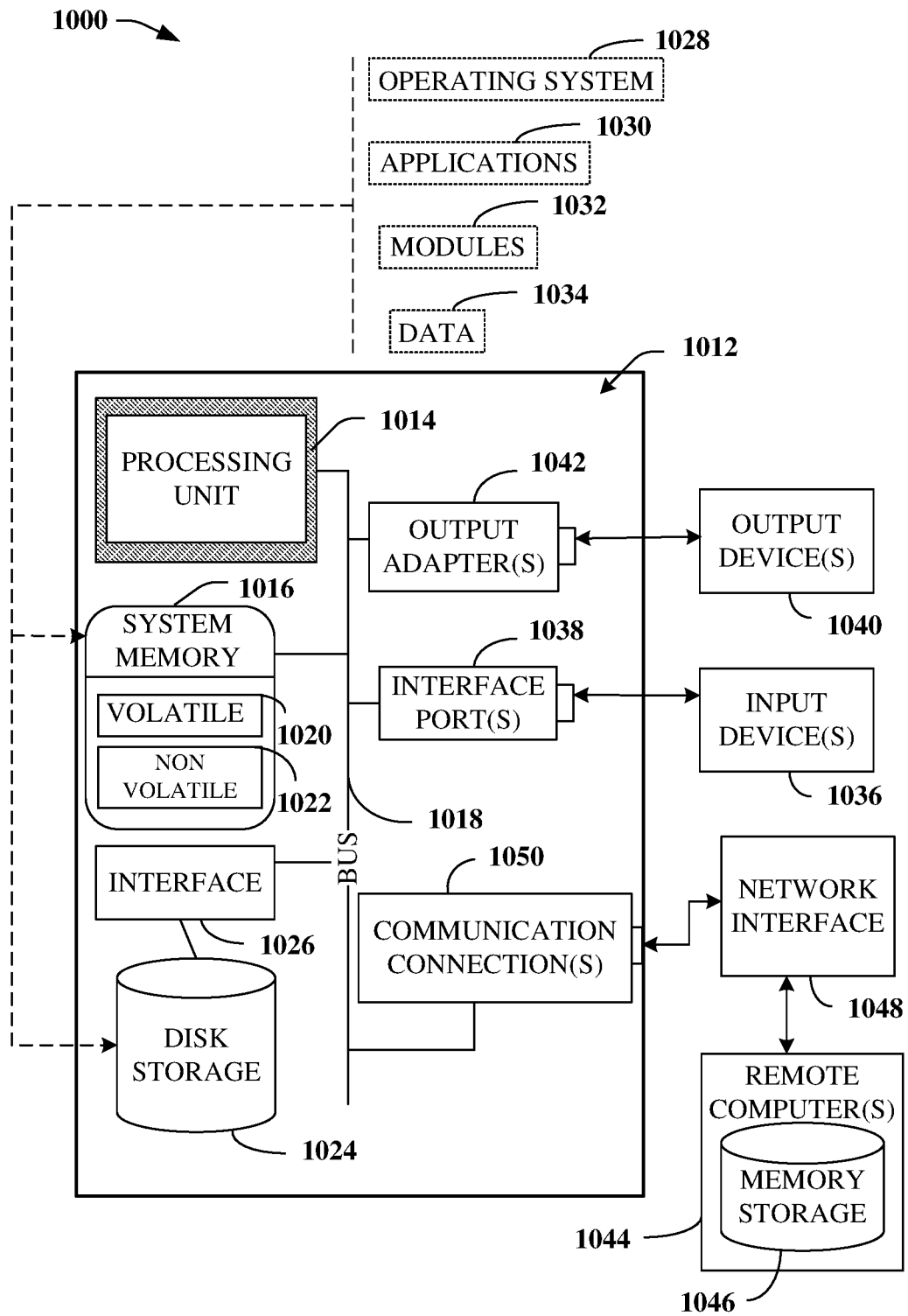
FIG. 10 illustrates an example block diagram of a computing system operable to execute the disclosed systems and methods in accordance with an embodiment.

In order to provide a context for the various embodiments of the disclosed subject matter, FIG. 10, and the following discussion, are intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated embodiments can also be practiced in distributed computing environments where tasks are performed by remote processing devices that are linked through a communications network; however, some if not all embodiments of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, etc., a device supporting an application instance, e.g., a reader application instance, a writer application instance, etc., corresponding to write(s) 106, read(s) 107, etc., EPIC 120, 220, 320, 420, 520, etc., or other components, can comprise a processing unit 1014, a system memory 1016, and a system bus 1018. System bus 1018 can couple system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an example embodiment, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining a first prioritized hashed key value based on the first event characteristic and a first event priority value. The determining can employ a selectable priority-sensitive hashing function, e.g., the particular hashing function is selectable from among several hashing functions as is disclosed elsewhere herein, and the hashing function can generate a value that is based on a key value and on a priority value as is also discussed herein. Moreover, the determining can be in response to receiving a first event characteristic that corresponds to a first event to be written to an ordered event stream of an ordered event stream storage system. The operations can further comprise enabling writing of the first event to the ordered event stream based on the first prioritized hashed key value.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer," or "inference," can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving a first event characteristic for a first event to be written to an ordered event stream being stored in an ordered event stream storage system;
   determining a first prioritized hashed key value based on the first event characteristic and a first event priority value from event priority values; and
   writing, to at least one storage device in the ordered event stream storage system, of the first event to the ordered event stream in accordance with the first prioritized hashed key value, wherein the first prioritized hashed key value directs the writing of the first event to an epoch associated with the ordered event stream that is correlated with an amount of delay associated with reading the first event based on the first event priority value.

2. The system of claim 1, wherein the first event priority value is a default event priority value.

3. The system of claim 1, wherein the first event priority value is a substitute for a default event priority value, and wherein the first event priority value corresponds to the first event to be written to the ordered event stream.

4. The system of claim 1, wherein the determining of the first prioritized hashed key value results in a same prioritized hashed key value as a second prioritized hashed key value based on a second event characteristic that is the same as the first event characteristic and a second event priority value that is the same as the first event priority value, and wherein the second event characteristic and the second event priority value correspond to a second event to be written to the ordered event stream.

5. The system of claim 1, wherein the determining of the first prioritized hashed key value results in a different prioritized hashed key value than a second prioritized hashed key value based on a second event characteristic and a second event priority value corresponding to a second event to be written to the ordered event stream.

6. The system of claim 5, wherein the second event characteristic is a same event characteristic as the first event characteristic.

7. The system of claim 5, wherein the second event priority value is a same event priority value as the first event priority value.

8. The system of claim 1, wherein the first event is written according to the first prioritized hashed key value to a first epoch of the ordered event stream, and wherein a second event is to be written according to a second prioritized hashed key value to a second epoch of the ordered event stream.

9. The system of claim 8, wherein a transition of the ordered event stream from the first epoch to the second epoch results in the first prioritized hashed key value being in a same prioritized hashed key range as the second prioritized hashed key value.

10. The system of claim 8, wherein a transition of the ordered event stream from the first epoch to the second epoch results in the first prioritized hashed key value being in a different prioritized hashed key range than the second prioritized hashed key value.

11. The system of claim 10, wherein the transition of the ordered event stream from the first epoch to the second epoch corresponds to an ordered event stream scaling operation.

12. The system of claim 10, wherein the transition of the ordered event stream from the first epoch to the second epoch corresponds to a change in a count of event priority values represented by a hashed key space topology corresponding to the ordered event stream.

13. A method, comprising:
   determining, by a system comprising a processor, a first prioritized hashed key value based on a first event characteristic and a first event priority value from event priority values, wherein the first event characteristic corresponds to a first event to be written to an ordered event stream being stored in an ordered event stream storage system; and writing, by the system, to at least one storage device in the ordered event stream storage system, of the first event to the ordered event stream based on the first prioritized hashed key value, wherein the writing excludes explicitly storing the first event priority value in the first event, and wherein the first prioritized hashed key value directs the writing of the first event to an epoch associated with the ordered event stream that is correlated with an amount of delay associated with reading the first event based on the first event priority value.

14. The method of claim 13, wherein the determining of the first prioritized hashed key value results in a different prioritized hashed key value than a second prioritized hashed key value based on a second event characteristic and a second event priority value corresponding to a second event to be written to the ordered event stream.

15. The method of claim 14, wherein the second event characteristic is a same event characteristic as the first event characteristic.

16. The method of claim 14, wherein the second event priority value is a same event priority value as the first event priority value.

17. A non-transitory machine-readable medium, comprising executable instructions that, when executed by a processor, facilitate performance of operations, comprising:

in response to receiving a first event characteristic corresponding to a first event to be written to an ordered event stream being stored in an ordered event stream storage system, determining a first prioritized hashed key value based on the first event characteristic and a first event priority value from event priority values, wherein the determining employs a hashing function that can be selected from among hashing functions; and writing, to at least one storage device in the ordered event stream storage system, of the first event to the ordered event stream based on the first prioritized hashed key value, wherein the first prioritized hashed key value directs the writing of the first event to an epoch associated with the ordered event stream that is correlated with an amount of delay associated with reading the first event based on the first event priority value.

18. The non-transitory machine-readable medium of claim 17, wherein the determining of the first prioritized hashed key value results in a different prioritized hashed key value than a second prioritized hashed key value based on a second event characteristic and a second event priority value corresponding to a second event to be written to the ordered event stream.

19. The non-transitory machine-readable medium of claim 18, wherein the second event characteristic is a same event characteristic as the first event characteristic.

20. The non-transitory machine-readable medium of claim 18, wherein the second event priority value is a same event priority value as the first event priority value.

* * * * *